(12) United States Patent
Homer

(10) Patent No.: US 9,776,718 B2
(45) Date of Patent: Oct. 3, 2017

(54) PERSONAL FLUID-JET THRUST PACK WHICH PROVIDES ROTATION FOR A RIDER ABOUT THREE AXES

(71) Applicant: Nicholas Wright Homer, Riverton, UT (US)

(72) Inventor: Nicholas Wright Homer, Riverton, UT (US)

(73) Assignee: WATERFLIGHT DYNAMICS HOLDINGS LLC, Salt Lake City, UT (US)

( * ) Notice: Subject to any disclaimer, the term of this patent is extended or adjusted under 35 U.S.C. 154(b) by 63 days.

(21) Appl. No.: 14/899,412

(22) PCT Filed: Jun. 20, 2014

(86) PCT No.: PCT/US2014/043526
§ 371 (c)(1),
(2) Date: Dec. 17, 2015

(87) PCT Pub. No.: WO2014/205419
PCT Pub. Date: Dec. 24, 2014

(65) Prior Publication Data
US 2016/0144960 A1    May 26, 2016

Related U.S. Application Data

(60) Provisional application No. 61/837,314, filed on Jun. 20, 2013, provisional application No. 61/931,093, filed on Jan. 24, 2014.

(51) Int. Cl.
*B64C 39/02* (2006.01)
*B63B 35/73* (2006.01)
(Continued)

(52) U.S. Cl.
CPC ............ *B64C 39/026* (2013.01); *B63B 35/73* (2013.01); *B63B 35/731* (2013.01); *B63H 11/04* (2013.01); *B63H 2011/006* (2013.01)

(58) Field of Classification Search
CPC ...... B64C 39/026; B63B 35/73; B63B 35/731
See application file for complete search history.

(56) References Cited

U.S. PATENT DOCUMENTS 3,443,775 A * 5/1969 Williams .............. B64C 39/026
244/4 A
7,900,867 B2   3/2011 Li
(Continued)

*Primary Examiner* — Justin Benedik
(74) *Attorney, Agent, or Firm* — Angus C. Fox, III

(57) ABSTRACT

The present invention provides lightweight fluid-jet thrust pack which provides three rotational axes and reduced restriction of fluid flow to the output nozzles. A first rotational axis is provided by a first rotatable coupling that is concentric with a coupler for a hose supplying pressurized fluid. The top of the first coupling has a splitter which directs incoming fluid into two splayed stub supply pipes. A preformed, reinforced rubber hose connects each stub supply pipe to one of a pair of coaxial rotatable couplings at opposite ends of a tiltable cross arm assembly that is pivotally secured to tower support bracket that is secured to the first rotatable coupling. An outward rotatable portion of each of the coaxial rotatable couplings is equipped with one boot-mounting platform and a downward-projecting jet nozzle that is in communication with the stub receiver pipe of the same rotatable coupling.

20 Claims, 25 Drawing Sheets

(51) Int. Cl.
*B63H 11/04* (2006.01)
*B63H 11/00* (2006.01)

(56) References Cited

U.S. PATENT DOCUMENTS

| | | | |
|---|---|---|---|
| 8,336,805 B1 * | 12/2012 | Zapata | B64C 39/026 114/315 |
| 8,960,115 B2 * | 2/2015 | Frisky | B63B 35/731 114/55.58 |
| 2014/0332634 A1 * | 11/2014 | Li | B64C 39/026 244/23 A |
| 2014/0332635 A1 * | 11/2014 | Weider | B64C 39/026 244/23 A |
| 2015/0158567 A1 * | 6/2015 | Zapata | B63B 35/73 440/38 |

* cited by examiner

PERSONAL FLUID-JET THRUST PACK WHICH PROVIDES ROTATION FOR A RIDER ABOUT THREE AXES

PREVIOUS APPLICATIONS

This application incorporates by reference the following U.S. Provisional patent applications: application No. 61/837,314, filed on Jun. 20, 2013; and application No. 61/931,093, filed on Jan. 24, 2014. These two referenced application and the present application have common inventorship.

BACKGROUND OF THE INVENTION

1. Field of the Invention

This invention relates, generally, to an propulsion device for a rider/operator. The device, which has a thrust unit coupled to a compression station with a flexible hose, through which pressurized fluid generated by the compression station is fed, is provided with three degrees of freedom (i.e., movement about three axis) between the coupling of the hose to the thrust unit and the feet of the rider/operator.

2. History of the Prior Art

Personal flight has been an eternal dream and only a fairly recent reality. However, unlike birds, human beings have a low power-to-weight ratio. It was not until Nov. 21, 1783 that the first human flight in a balloon took place. The first powered balloon flight occurred a year later. On Oct. 22, 1797, André-Jacques Garnerin was the first human to use a parachute, which was released from a balloon from an altitude of about 6,500 ft over Monceau Park in Paris.

The first heavier-than-air flight, depending on which version of history one accepts, was accomplished either by Gustave Whitehead on Aug. 14, 1901 or by Orville and Wilbur Wright on Dec. 17, 1903.

On Oct. 14, 1947—less than fifty years after the first heavier-than-air flight, U.S. Air Force Capt. Charles E. Yeager flew the Bell X-1 rocket-powered research aircraft faster than the speed of sound.

Though initially hampered by the non-existence of structural materials that were both ultra-strong and ultra-light, human-powered flight progressed from a 6.1-meter hop in 1923, to a 35.82 km English Channel crossing by Bryan Allen on Jun. 12, 1979 in the Paul MacCready-designed Gossamer Albatross and, finally, to an amazing 115.11 km flight from Iraklion on the island of Crete to Santorini, Greece in the MIT Daedalus 88 piloted by Kanellos Kanellopoulos on Apr. 23, 1988. The 1988 distance remains unsurpassed.

One might reasonably conclude that practical personal flight has only been accomplished with machines that combine powerful engines and aerodynamic airfoils. Examples of such machines include fixed wing airplanes, autogyro aircraft, and helicopters. Arguably, the closest experience to that of individual, unrestricted flight has been attained through the use of single passenger devices, consisting mainly of a rocket flight pack or similar structure that fits on or around the torso of an individual. Such devices typically require a highly flammable and explosive fuel for the development of sufficient thrust for flight. Such devices are difficult to control and invariably have very limited range.

As an alternative to employing combustible fuels to generate thrust, recreational thrust units which employ pressurized water have become popular during the past decade. U.S. Pat. No. 7,900,867 to Raymond Li, titled PERSONAL PROPULSION DEVICE, discloses a personal propulsion device including a body unit having a center of gravity, where the body unit includes a thrust assembly providing a main conduit in fluid communication with at least two thrust nozzles, with the thrust nozzles being located above the center of gravity of the body unit. The thrust nozzles are independently pivotable about a transverse axis located above the center of gravity, and may be independently controlled by a single common linkage. The present invention may further include a base unit having an engine and a pump, which provides pressurized fluid to the body unit through a delivery conduit in fluid communication with both the base unit and the thrust assembly. A more recent U.S. Pat. No. 8,336,805 to Frankie Zapata, discloses a propulsion device comprising a body arranged for receiving a passenger and engaging with a thrust unit supplied with a pressurized fluid from a compression station. The arrangement of such a device offers great freedom of movement through the air or under the surface of a fluid. The invention also relates to a propulsion system in which the compression station can be remote in the form of a motorized marine vehicle. The primary differences between the li and Zapata inventions are that the Li device is designed as a backpack, while the Zapata device is designed as a thrust pack to which the rider's feet are attached. In addition, whereas the Li device utilized a specialized, single-use compression station, the Zapata device simply couples the water outlet of a jet ski watercraft to the thrust pack with a hose. Of course, in the case of both Li and Zapata inventions, range of the propulsion devices is limited by the length of the coupling hose, and hose length is, in turn, limited by both internal friction loses and the weight of the hose and encapsulated water that must be lifted along with the rider and thrust pack.

Contemporary thrust packs have, at most, two degrees of freedom. They are typically able to rotate about the hose-coupling axis. In addition, the thrust nozzles (one under each foot) can be rotated on a single axis so that they will cause the platform, on which the rider stands, to spin. However, one of the problems associated with current thrust pack designs is that, while they work well when the end of the hose that is coupled to the thrust pack is oriented vertically, they do not work nearly as well when the rider's body is no longer perpendicular with respect to the body of water in which the ride occurs.

What is needed is a thrust pack having an additional degree of freedom so that a rider can continue to spin, even as the hose and the rider's body are inclined from the vertical.

SUMMARY OF THE INVENTION

The present invention overcomes the problems associated with the prior art personal fluid-jet thrust units by providing an additional degree of freedom that enables a rider to spin his body even when the connector hose is far from vertical. Four embodiments of an thrust unit incorporating three rotational axes are disclosed. The first three embodiments are functionally similar. For the first embodiment, a first rotational axis is provided by a first rotatable coupling that is concentric with a coupler for a hose supplying pressurized fluid. A single rigid pipe exits the side of the first rotatable coupling opposite the side where the hose is coupled, and is forked to make a hollow V-shaped structure. A second rotational axis is provided by a first pair of rotatable couplings, each of which is affixed to a Hooke's joint spider and to one of two independently-directable jet nozzles and one of two boot mounting platforms. A third rotational axis is provided by a second pair of rotatable couplings which interconnect the hollow spider to the ends of the hollow V-shaped structure. The complete structure provides a pair of sealed channels, or conduits, for pressurized fluid to flow from the first rotatable coupling to the cross-shaped spider and, then, to each of the jet nozzles. A second embodiment of the invention locates the first rotational axis between two sections of hose apart from the thrust pack itself. For a third embodiment of the invention, the fluid flow is not split immediately after the first rotatable coupling. Instead, one-half of the V-shaped structure is eliminated, with the remaining half carrying the full flow of water. After the 115-degree elbow, a single straight conduit runs into a single 4-unit Lazy Susan rotatable coupling. After the single rotatable coupling, the fluid flow is split with a T-splitter into smaller tubes and then into the two, concentric, 4-unit Lazy Susan rotatable couplings. It is believed that the full V-shaped structure is the strongest, as the Hooke's joint spider is supported on two sides, rather than a single side.

The fourth embodiment of the invention is the preferred embodiment, as it not only overcomes the problems associated with the prior art thrust units by providing an additional degree of freedom that enables a rider to spin his body even when the connector hose is far from vertical, but also eliminates one of the abrupt 90-degree turns required in the propulsion water path of the first three embodiments. As with the first three embodiments, the fourth embodiment of the invention incorporates three rotational axes. A first rotational axis is provided by a first rotatable coupling that is concentric with a coupler for a hose supplying pressurized fluid. On the opposite side of the rotatable coupling, a splitter halves the fluid flow and directs each half into one of two stub supply pipes, which are outwardly-splayed at an angle of about 20 degrees to the couplings rotational axis. A tower support bracket is welded to the coupler on the splitter side thereof. The distal end of the tower support bracket has a single pivot point to which the center of a cross arm assembly is pivotally secured. The cross arm assembly is rotatably tiltable with respect to the tower support bracket, thereby providing a second rotational axis. A third rotational axis is provided by a pair of coaxial rotatable couplings mounted at opposite ends of the cross arm assembly. An inward and non-rotatable portion of each of the coaxial rotatable couplings is equipped with a stub receiver pipe, whereas an outward rotatable portion of each of the coaxial rotatable coupling is equipped with one boot-mounting platform and a downward-projecting jet nozzle that is in communication with the stub receiver pipe of the same rotatable coupling. A preformed, reinforced rubber connector hose connects each of the stub supply pipes to one of the stub receiver pipes. Each stub receiver pipe is canted in a horizontal direction away from the coaxial axis in order to better clear the tower support bracket and the pivot of the cross arm assembly.

DETAILED DESCRIPTION OF THE INVENTION

The thrust unit will now be described with reference to the attached drawing figures. It should be understood that the drawings are not necessarily drawn to scale, and are intended to be merely illustrative of the invention.

Figure 1:
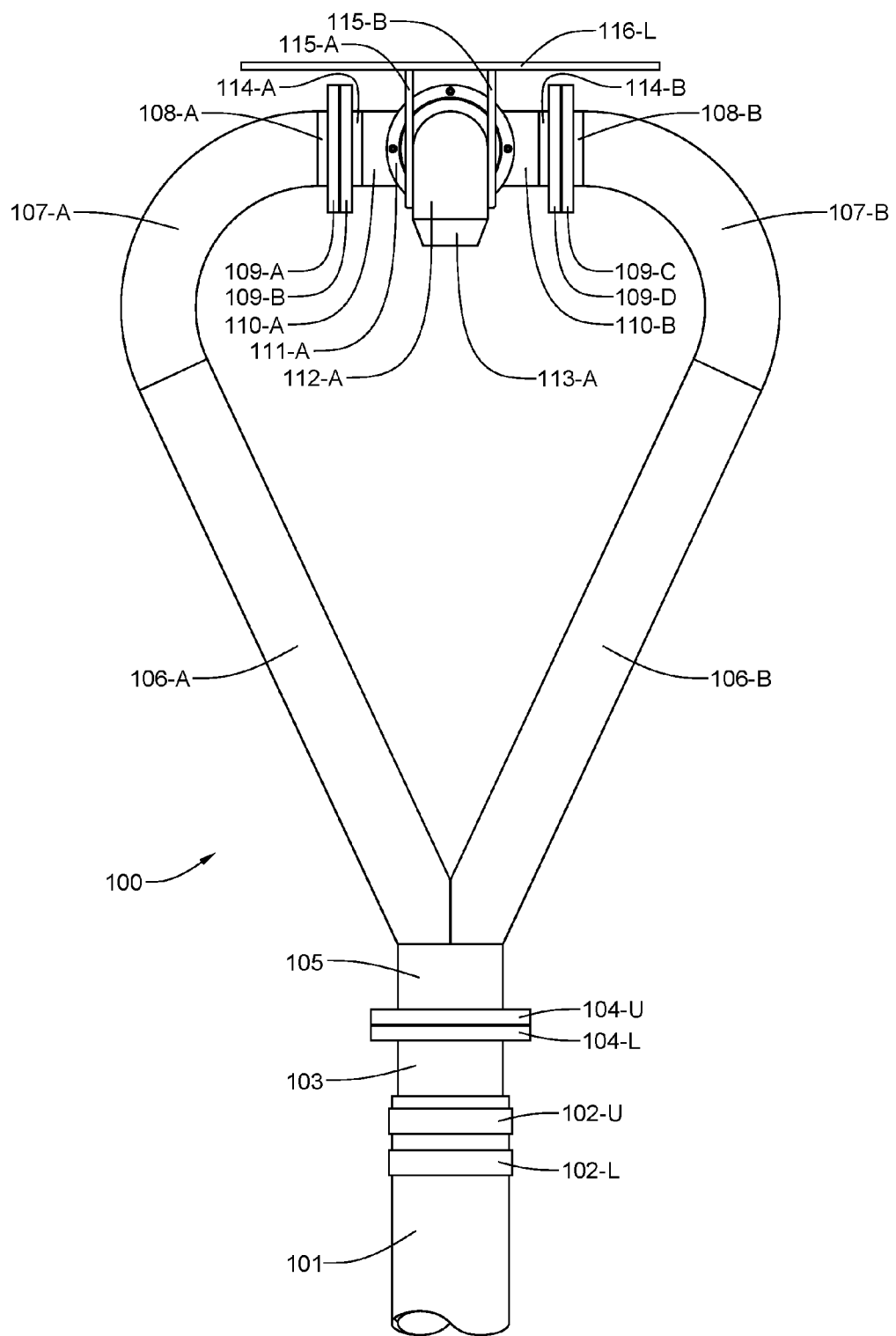
FIG. 1 is a left-side elevational view of a prototype first embodiment thrust pack.

Referring now to FIG. 1, a first embodiment personal fluid-jet thrust unit 100 has a stub connector tube 103 that is coupled to a flexible hose 101 with upper and lower securing straps 102-U and 102-L, respectively. The opposite end of the flexible hose 101 is coupled to the jet pump outlet of a jet ski personal watercraft (not shown). A first rotatable coupling is constructed from upper and lower portions 104-U and 104-L, respectively. For a prototype of the invention, each portion is a "Lazy Susan" aluminum bearing assembly having an outside diameter of 150 mm and an inside diameter of 99 mm. The rotatable coupling is constructed by bolting the outer races of both Lazy Susans together—with a laminar spacer between the outer races—in a concentric configuration. The inner races of each Lazy Susan bearing assembly can, thereby, rotate independently. The upper end of the stub connector tube 103 is welded to the inner race of the lower Lazy Susan assembly 104-L. The lower end of a transition tube 105 is welded to the inner race of the upper Lazy Susan bearing assembly 104-U. The transition tube 105 transitions from cylindrical at its base to oval at the top thereof. The oval configuration is enables a pair of intersecting cylindrical tubes 106-A and 106-B to be sealably welded to the top of the transition tube 105 in, preferably, a 50-degree V-shaped configuration. A pair of 115-degree elbows 107-A and 107-B are welded to the upper ends of cylindrical tubes 106-A and 106-B, respectively. A first set of short cylindrical extensions 108-A and 108-B are, then, welded to elbows 107-A and 107-B, respectively. The free end of extension 108-A is welded to a an inner race of a second rotatable coupling consisting of bolted-together Lazy Susan aluminum assemblies 109-A and 109-B, while the free end of extension 108-B is welded to an inner race of a third rotatable coupling consisting of bolted-together Lazy Susan aluminum bearing assemblies 109-C and 109-D. The second and third rotatable couplings are concentric with one another, and both provide a second rotational axis. The second and third rotatable couplings are each constructed from a pair of bolted-together aluminum Lazy Susan bearing assemblies having an external diameter of 120 mm and an internal diameter of about 70 mm. Again, a laminar spacer is sandwiched between the two bolted-together outer races, thereby enabling the inner races to rotate independently of one another. A second set of short cylindrical extensions 114-A and 114-B are welded to the inner races of Lazy Susans 109-B and 109-D, respectively.

Figure 3:
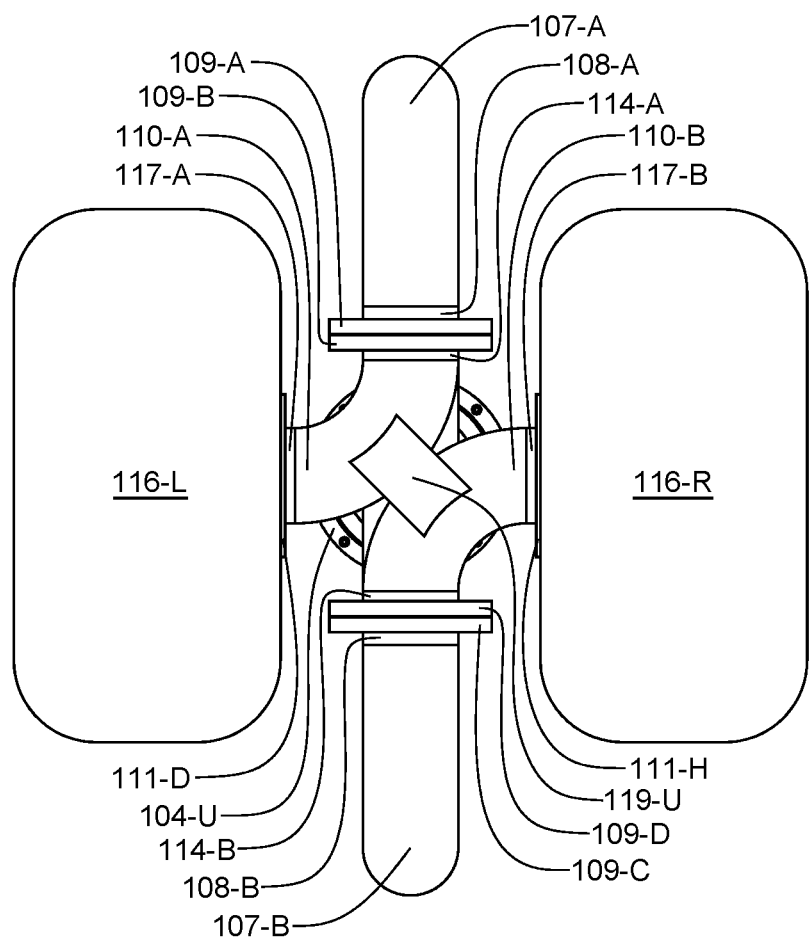
FIG. 3 is a top plan view of the prototype first embodiment thrust pack.

Referring now to the top view of FIG. 3, 90-degree tubular elbows 110-A and 110-B are welded to the free ends of extensions 114-A and 114-B, respectively. An upper strap 119-U is welded to the upper surfaces of both 90-degree elbows, while a lower strap 119-L is welded to the lower surfaces of the elbows directly below the upper strap 119-U, thereby creating a rigid, Hooke's-type spider.

Figure 2:
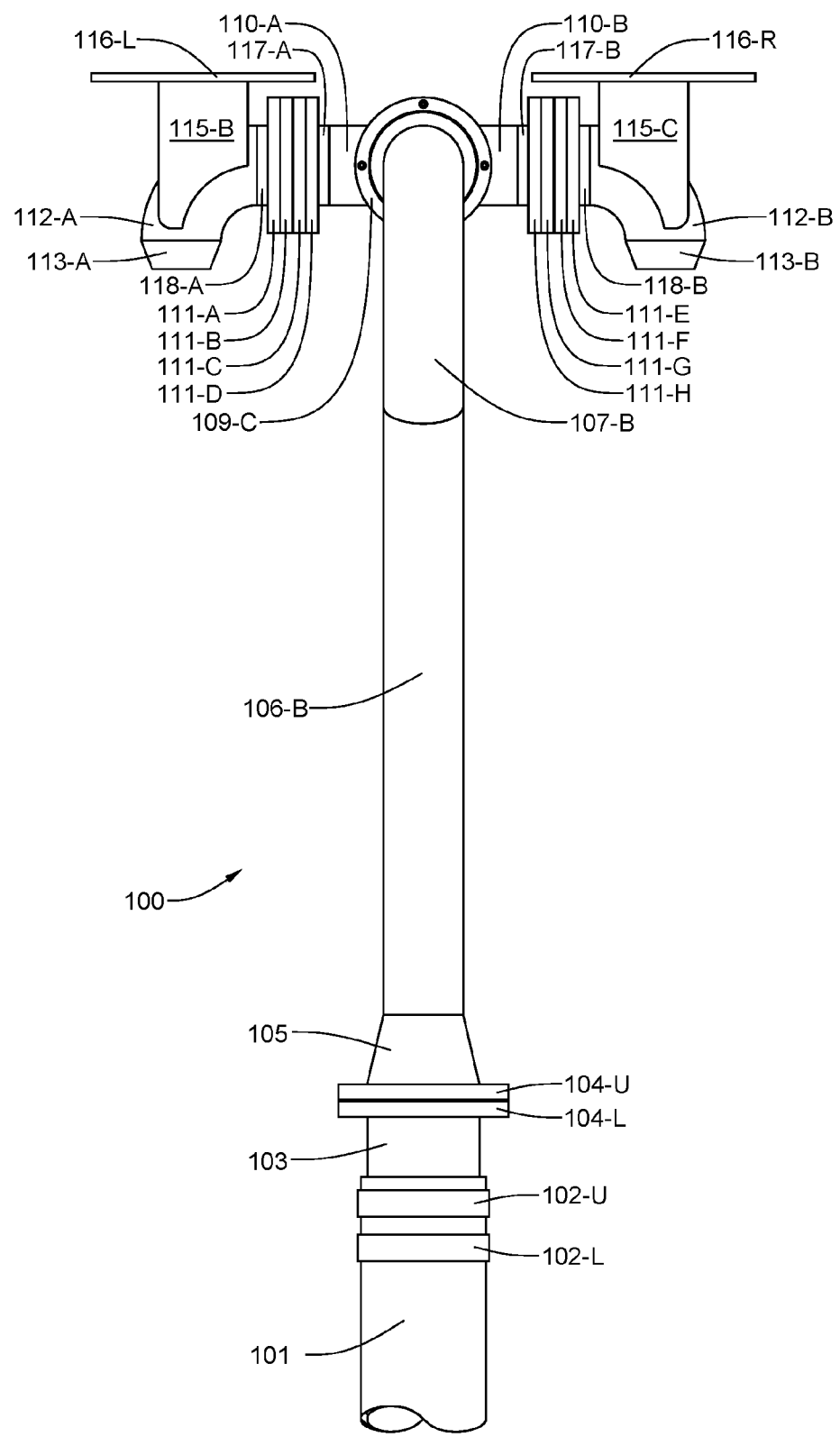
FIG. 2 is a rear elevational view of the prototype first embodiment thrust pack.

Referring now to FIG. 2, a third set of short cylindrical extensions 117-A and 117-B are welded to the free ends of 90-degree elbows 110-A and 110-B, respectively. Each extension of the third set is welded to the inner races of two Lazy Susan bearing assemblies having 120 mm outside diameters. These two bearing assemblies are coupled to two additional Lazy Susan bearing assemblies, for a total of four bearing assemblies for each rotatable coupling. Four bearing assemblies are used instead of two because of the cantilevered nature of the jet nozzles 112-A and 112-B, which are welded to the inner races of the two outermost Lazy Susan bearing assemblies. Thus, the four Lazy Susan bearing assemblies 111-A, 111-B, 111-C and 111-D and short cylindrical extension 118-A of a fourth set of extensions are associated with jet nozzle 112-A, while the four Lazy Susan bearing assemblies 111-E, 111-F, 111-G and 111-H and short cylindrical extension 118-B are associated with jet nozzle 112-B. Jet nozzle 112-A has a first conical fluid escape extension 113-A welded thereto, while jet nozzle 112-B has a second conical fluid escape extension 113-B welded thereto. It will be noted that a boot-mounting platform is associated with each jet nozzle: platform 116-L is welded to jet nozzle 112-A via brackets 115-A and 115-B, while platform 116-R is welded to jet nozzle 112-B via brackets 115-C and 115-D (not shown). A boot is attached to each platform preferably with a wakeboard binding.

Figure 4:
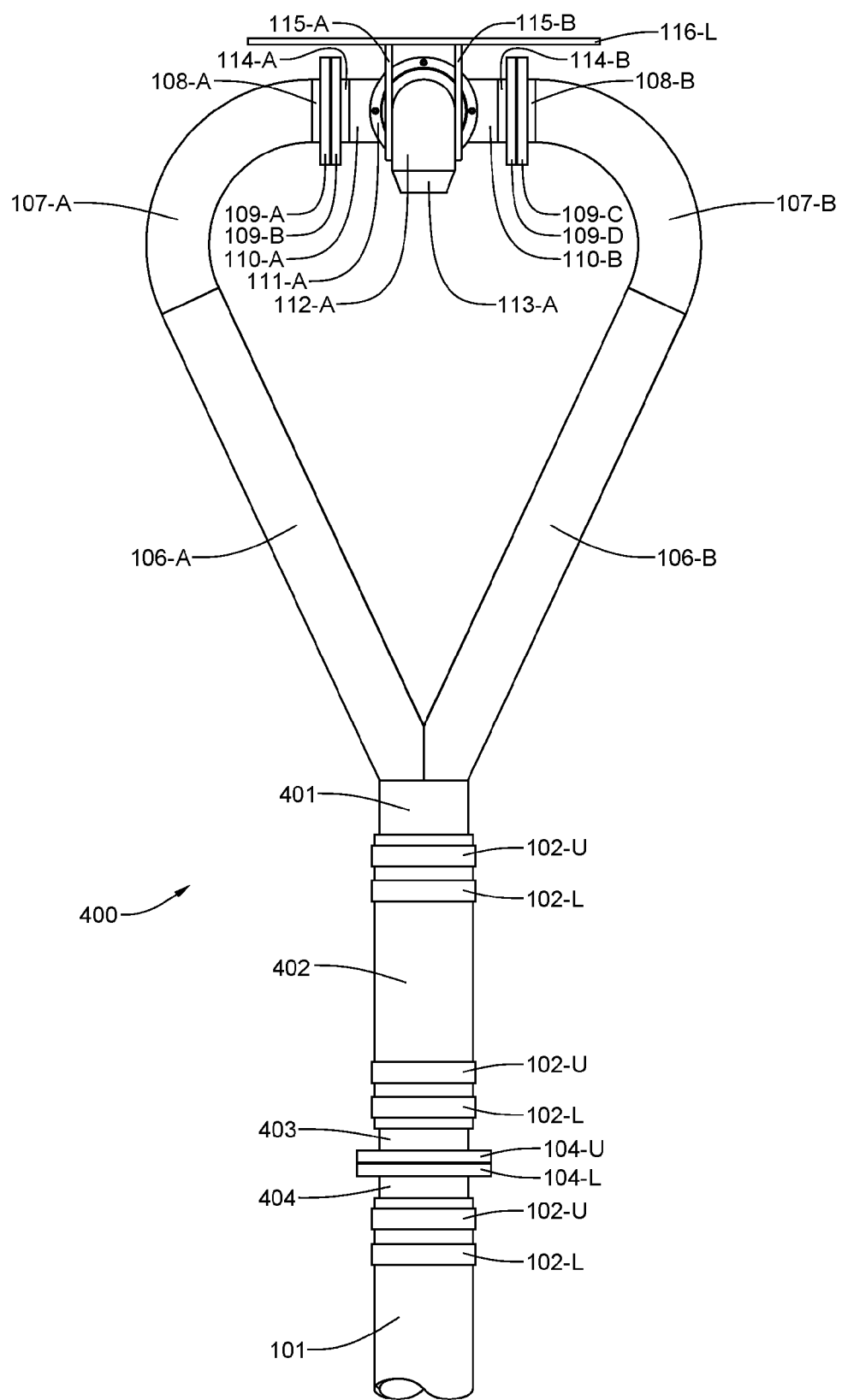
FIG. 4 is a left-side elevational view of a prototype second embodiment thrust pack.

Referring now to FIG. 4, a second embodiment thrust unit 400 is identical to the first embodiment from the intersecting tubes 106-A and 106-B. Below the V-shaped structure, the first rotatable coupling is positioned between two sections of flexible hose 101 and 402, rather than rig idly coupled to the V-shaped structure.

Figure 5:
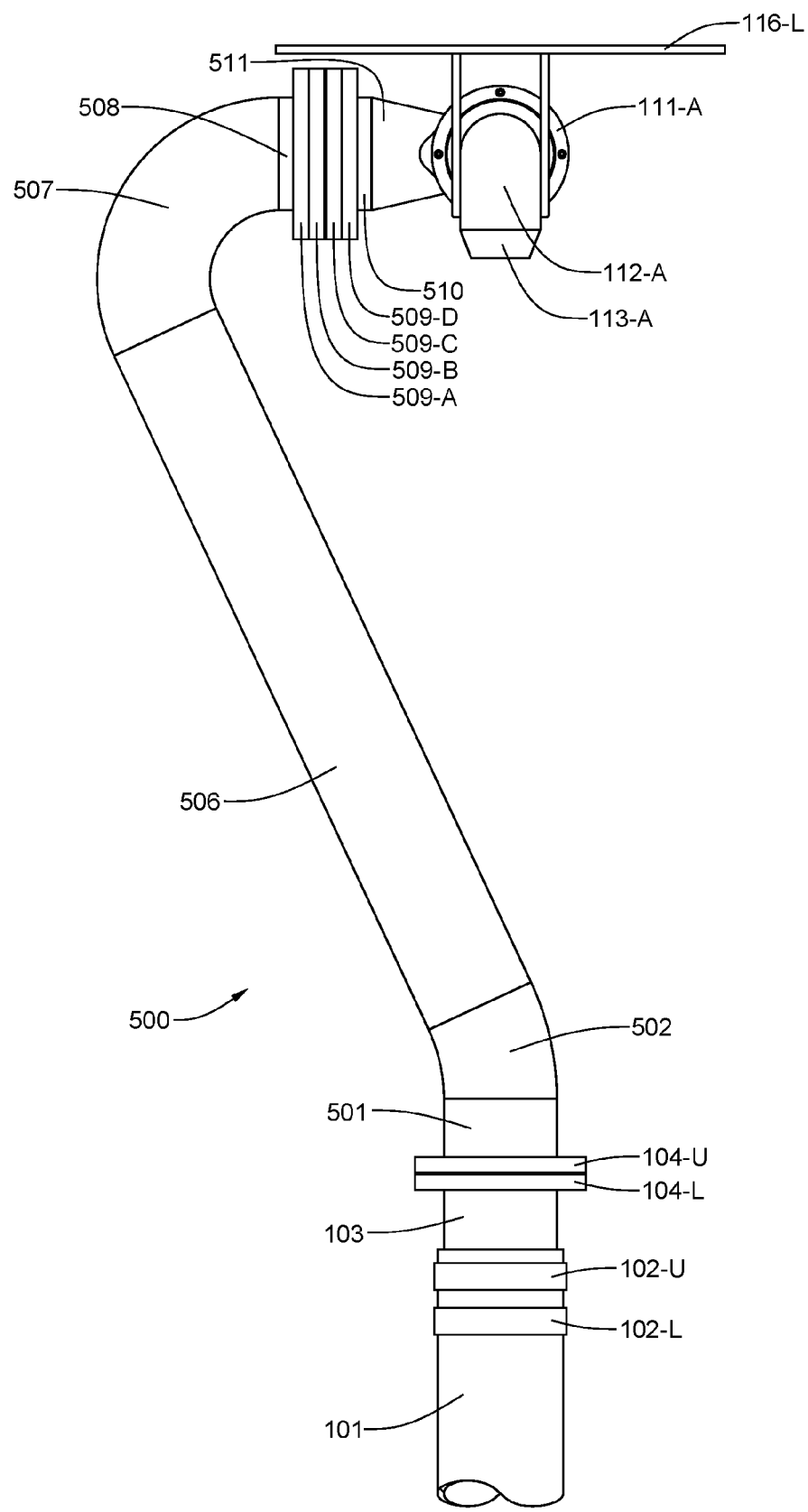
FIG. 5 is a left-side elevational view of a prototype third embodiment thrust pack.
Figure 6:
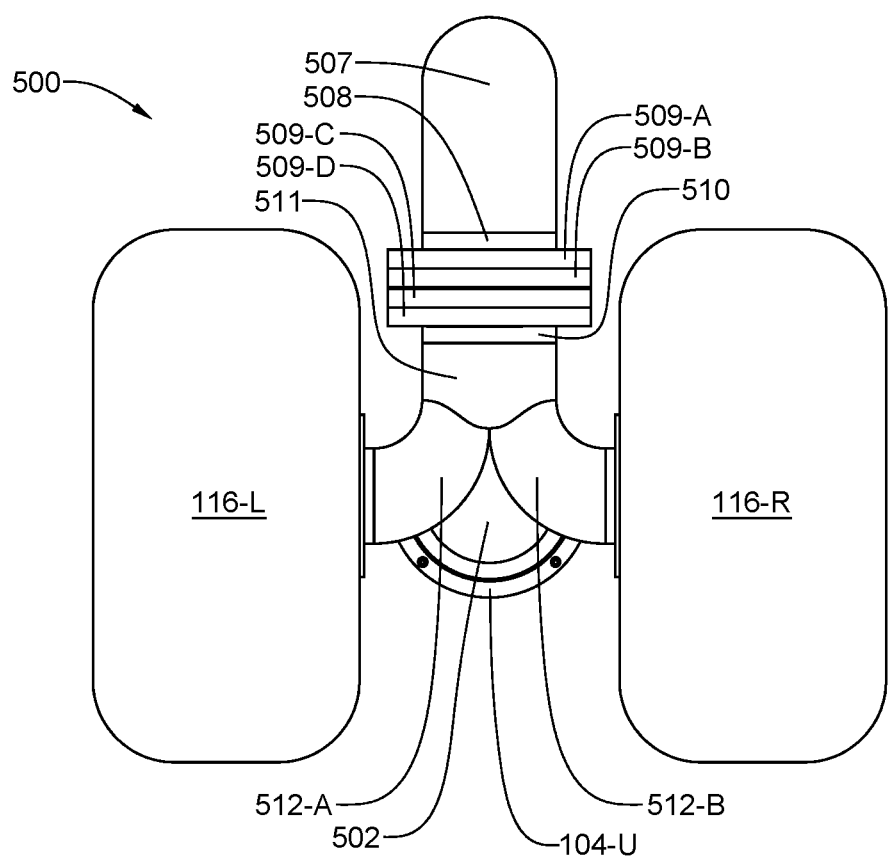
FIG. 6 is a top plan view of the prototype third embodiment thrust pack.
Figure 7:
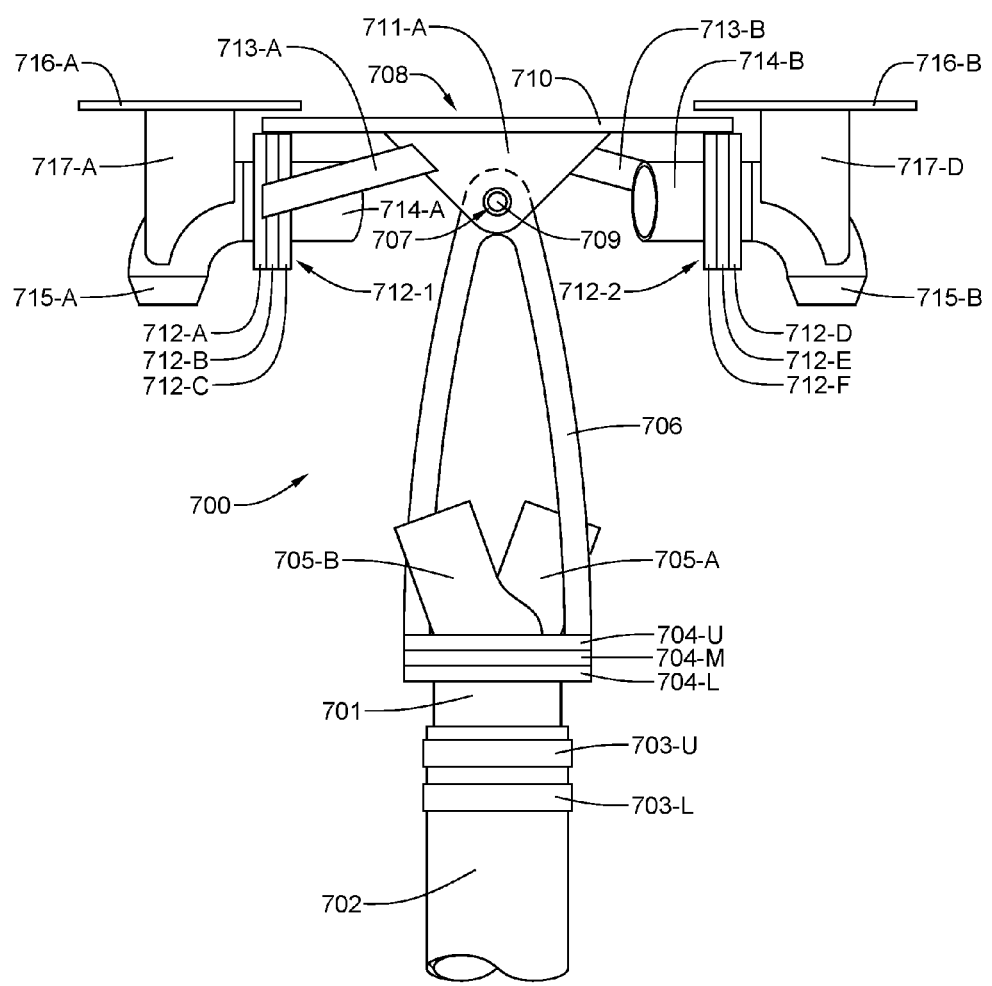
FIG. 7 is a front or rear elevational view of a prototype fourth embodiment thrust pack before attachment of the preformed, reinforced rubber connector hoses.
Figure 8:
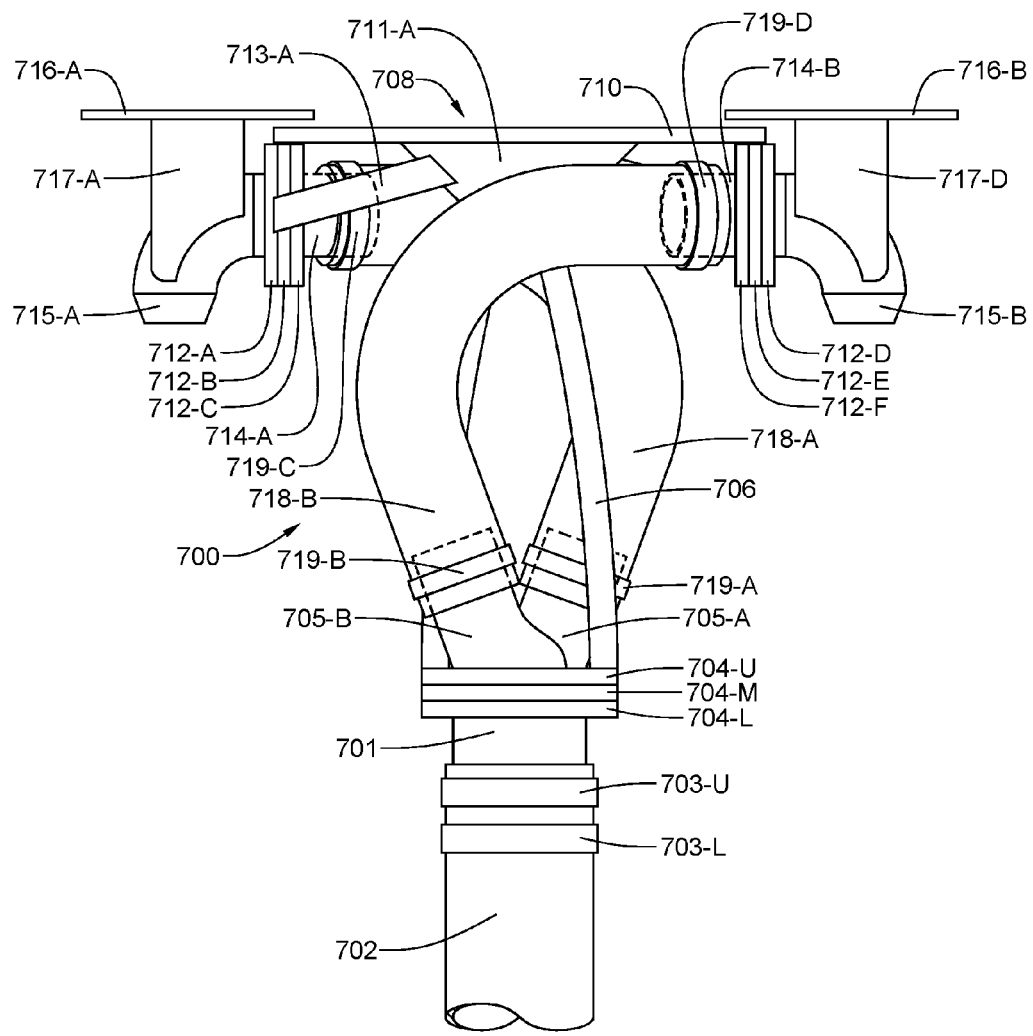
FIG. 8 is a front or rear elevational view of the prototype fourth embodiment thrust pack following attachment of the preformed, reinforced rubber connector hoses.
Figure 9:
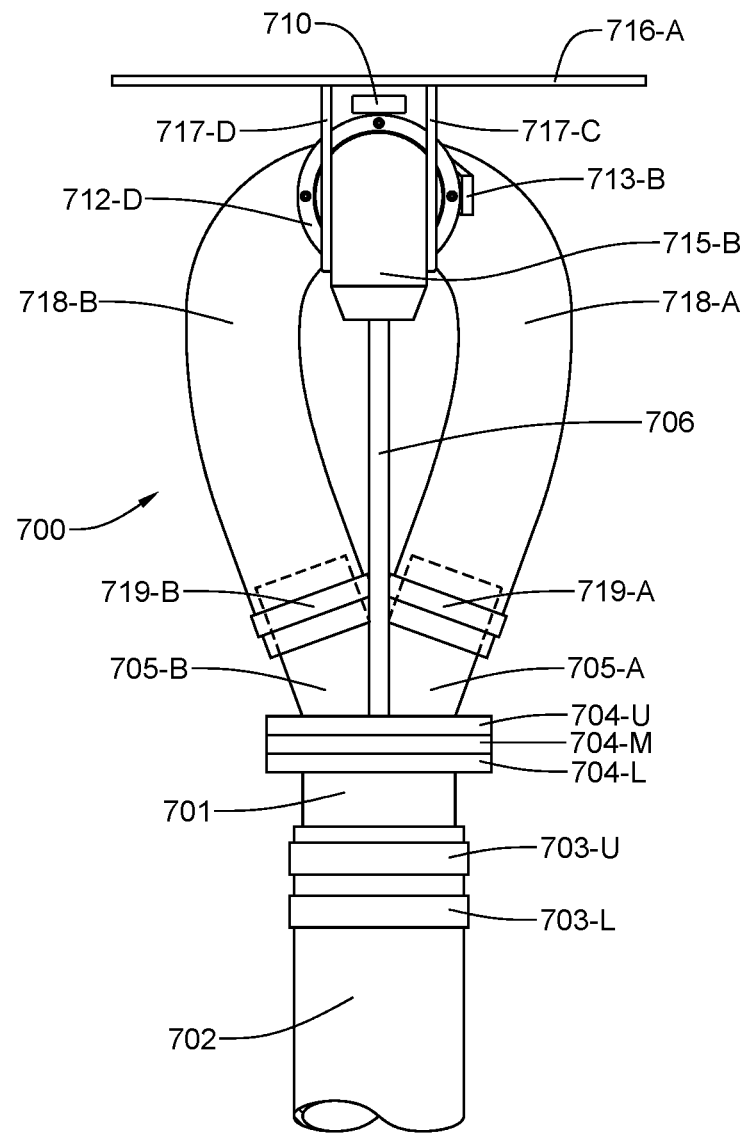
FIG. 9 is a side elevational view of the prototype fourth embodiment thrust pack following attachment of the preformed, reinforced rubber connector hoses.
Figure 10:
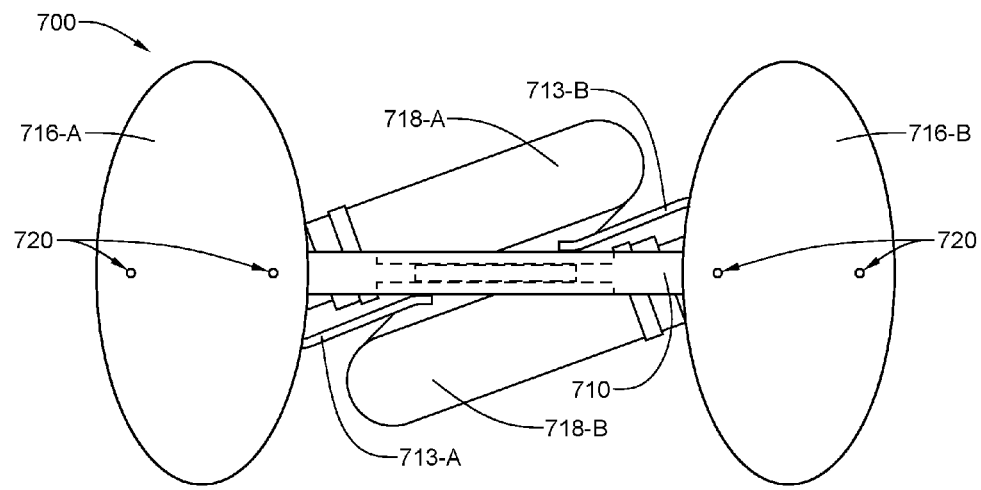
FIG. 10 is a top plan view of the prototype fourth embodiment thrust pack following attachment of the preformed, reinforced rubber connector hoses.
Figure 11:
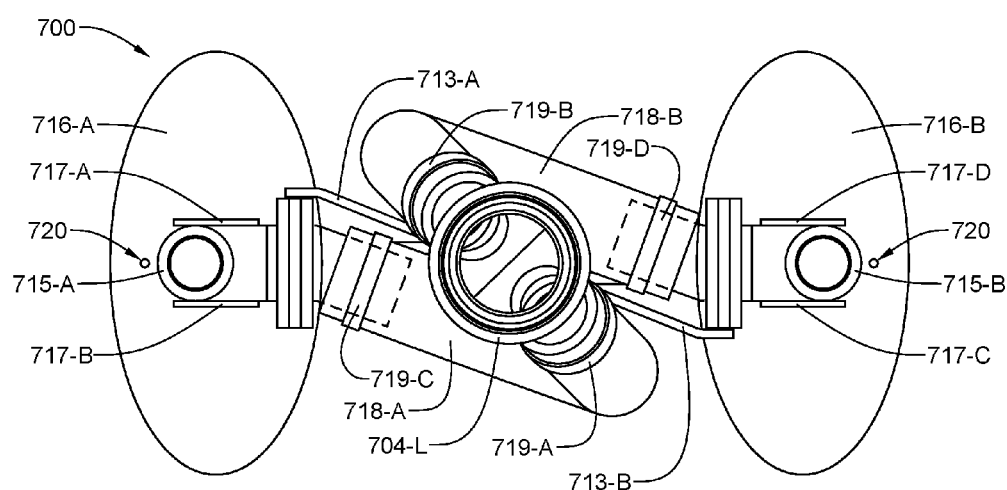
FIG. 11 is a bottom plan view of the prototype fourth embodiment thrust pack following attachment of the preformed, reinforced rubber connector hoses.

Referring now to FIGS. 5 and 6, a third embodiment thrust unit 500 does not split the flow of fluid immediately after the first rotatable coupling comprised of Lazy Susan bearing assemblies 104-U and 104-L. Rather, a short cylindrical stub conduit 501 and a short 25-degree bend conduit replace the transition tube 105, and a single slanted large straight conduit 506 replaces the V-shape-configured conduits 106-A and 106-B. A large-diameter 115-degree elbow 507 interconnects the large straight conduit 506 and a first short cylindrical stub tube 508. The free end of the short stub tube 508 is welded to the inner races of the first and second Lazy Susan bearing assemblies 509-A and 509-B of a second rotatable coupling comprising four large Lazy Susan bearing assemblies 509-A, 509-B, 509-C and 509-D having 150 mm outside diameters and 99 mm inside diameters. A second short cylindrical stub tube 510 is welded to the inner races of the third and fourth Lazy Susan bearing assemblies 509-C and 509-D. A transition tube that is both tapered and ovalized at the exit end, is welded to the exit end of the second short cylindrical stub tube 510 and a pair a 90-degree elbows 512-A and 512-B, which split the flow of fluid is diametrically-opposed directions. After the exit end of each 90-degree elbow, the apparatus is virtually identical to that of the first embodiment thrust unit 100. Although the brackets used to support the boot-mount platforms 116-L and 116-R are shown as being longer than those of the first embodiment 100, they were shown as such so that the second rotatable coupling was fully visible in the side view. There would have been adequate clearance even if the brackets had been identical.

There are two problems associated with the first, second and third embodiments of the invention. The first is weight, and the second is resistance to hydraulic flow caused by two abrupt 90-degree turns that are inherent in the design. Though the design is certainly more than functional, the reduction of water flow from the outlet of the jet ski watercraft to the outlets of the thrust pack is significant. A dramatic improvement in performance can be achieved by eliminating one of the abrupt 90-degree turns of the original three-axis thrust pack. A fourth embodiment of the invention, which eliminates one of the abrupt 90-degree turns in the water flow path, is also considerably lighter in weight.

The fourth embodiment 700 of an thrust unit will now be described with reference to attached drawing FIGS. 7 to 11. It should be understood that the drawings are not necessarily drawn to scale, and are intended to be merely illustrative of the invention.

Referring now to FIGS. 7 to 11, a fourth embodiment fluid-jet thrust unit 700 has a stub connector tube 701 that is coupled to a flexible hose 702 with upper and lower securing straps 703-U and 703-L, respectively. The opposite end of the flexible hose 702 is coupled to the jet pump outlet of a jet ski personal watercraft (not shown). A first rotatable coupling 704 is constructed from upper, middle and lower coupling components 704-U, 704-M and 704-L, respectively. For a prototype of the invention, each portion is a "Lazy Susan" aluminum bearing assembly having an outside diameter of about 150 mm and an inside diameter of about 99 mm. Each Lazy Susan has an inner ring and an outer ring that are joined with a ball bearing race between the inner and outer rings. The rotatable coupling is constructed by bolting the outer races of all three Lazy Susans together in a coaxial configuration, with a laminar spacer between the outer races of components 704-U and 704-M. The inner rings of components 704-L and 704-M are able, thereby, to rotate together without rubbing on the inner race of component 704-u. The stub connector tube 701 is welded to the inner rings of components 704-L and 704-M. A fluid flow splitter is formed by two stub supply pipes 705-A and 705-B, which are welded to both the inner and outer rings of upper Lazy Susan component 704-U. Each of the two stub supply pipes 705-A and 705-B are outwardly-splayed at an angle of about 20 degrees to the rotational axis of the first rotatable coupling 704. A tower support bracket 706 is welded to the outer ring of upper coupling component 704-U. The distal end of the tower support bracket has a pivot aperture 707, the pivot axis of which is perpendicular to the rotational axis of the first rotatable coupling 704. A cross arm assembly 708 is pivotally secured at its center to the single pivot 707 of the tower support bracket 706 with a pivot pin 709. The cross arm assembly 708 is fabricated from a horizontal cross beam 710, a pair of pivot ears 711-A and 711-B which are welded to the horizontal cross beam 710, and first and second coaxial rotatable couplings 712-1 and 712-2, respectively which are welded to the horizontal cross beam 709. A first brace 713-A is welded to pivot ear 711-A and to rotatable coupling 712-1, while a second brace 713-B is welded to pivot ear 711-B and to rotatable coupling 712-2. The cross arm assembly 708 is tiltable with respect to the tower support bracket 706, thereby providing a second rotational axis. A third rotational axis is provided by the pair of coaxial rotatable couplings 712-1 and 712-2, which are mounted at opposite ends of the cross arm assembly 708. Rotatable coupling 712-1 is constructed from three Lazy Susan bearing assemblies 712-A, 712-B and 712-C, each of which has an external diameter of about 120 mm and an internal diameter of about 70 mm. Rotatable coupling 712-2 is also constructed from the same type of Lazy Susan bearing assemblies, which are labeled components 712-D, 712-E and 712-F. The components of rotatable couplings 712-1 and 712-2 are assembled in a manner similar to that used for assembling the first rotatable coupling 704. The outer rings of all three Lazy Susan components are bolted together and welded to the horizontal cross beam 710, with a laminar spacer between the outer rings of components 712-B and 712-C and a laminar spacer between outer rings of components 712-E and 712-F. A first stub receiver pipe 714-A is welded to the inner ring of Lazy Susan component 712-C, while a second stub receiver pipe 714-B is welded to the inner ring of Lazy Susan component 712-F. It will be noted that each stub receiver pipe 714-A and 714-B is canted in a horizontal direction away from the coaxial axis in order to better clear the tower support bracket 706 and the pivot ears 711-A and 711-B of the cross arm assembly 708. A downward projecting jet nozzle 715-A is welded to the inner rings of components 712-A and 712-B, while a downward projecting jet nozzle 715-B is welded to the inner rings of components 712-D and 712-E. A boot mounting platform 716-A is rigidly affixed to jet nozzle 715-A with platform brackets 717-A and 717-B, each of which is welded to the boot mounting platform 716-A and to the jet nozzle 715-A. Likewise, a boot mounting platform 716-B is rigidly affixed to jet nozzle 715-B with platform brackets 717-C and 717-D, each of which is welded to the boot mounting platform 716-B and to the jet nozzle 715-B. A first preformed, reinforced-rubber connector hose 718-A connects stub supply pipe 705-A to stub receiver pipe 714-A, while a second preformed, reinforced-rubber connector hose 718-B connects stub supply pipe 705-B to stub receiver pipe 714-B. Straps 719-A and 719-C are used to secure the rubber hose 718-A to stub supply pipe 705-A and to stub receiver pipe 714-A, respectively. Likewise, straps 719-B and 719-D are used to secure rubber hose 718-B to stub supply pipe 705-B and to stub receiver pipe 714-B, respectively. Threaded apertures 720 enable a boot to be mounted to each platform 716-A or 716-B.

When in actual use in water, thrust units 100, 400, 500 and 700 are wrapped with foam to make the thrust units floatable. The foam wrapping has not been shown in the drawings, as it partially obscures the structural components of the thrust unit.

Figure 12:
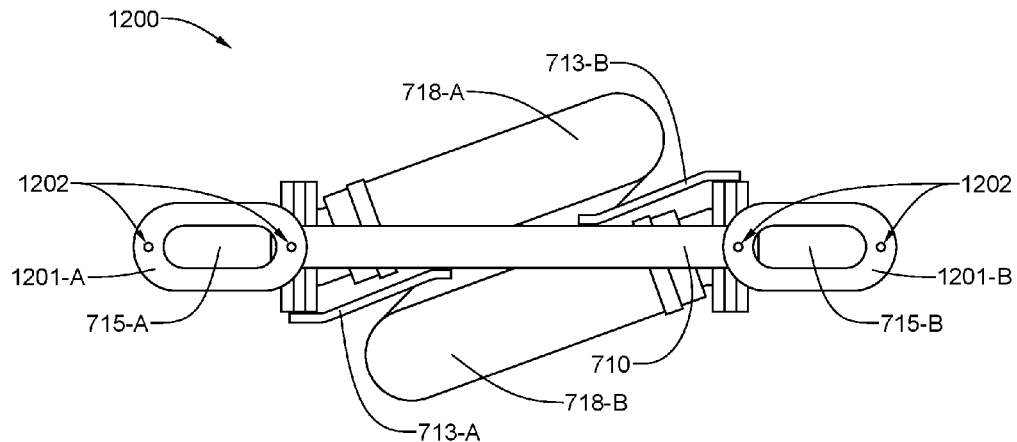
FIG. 12 is a top plan view of a prototype fourth embodiment thrust pack having alternative rider mounts following attachment of the preformed, reinforced rubber connector hoses.
Figure 13:
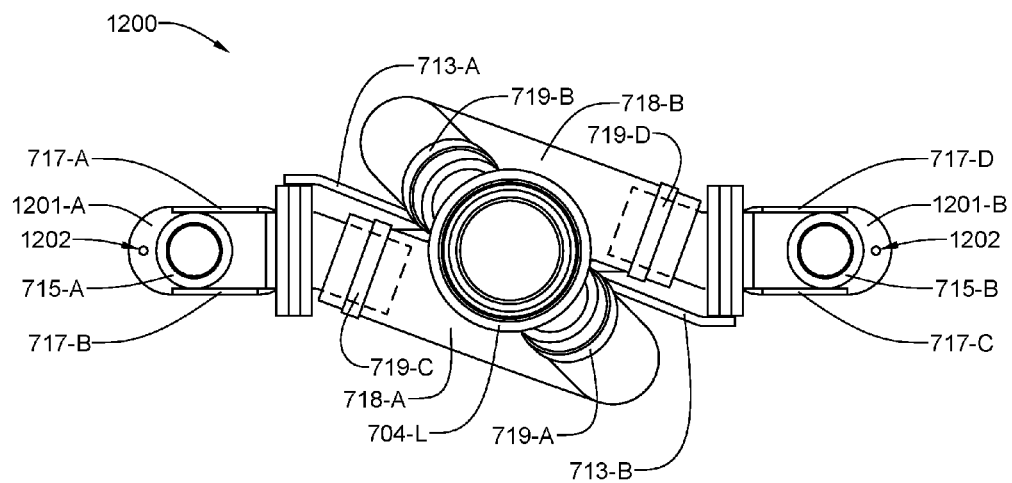
FIG. 13 is a bottom plan view of the prototype fourth embodiment thrust pack of FIG. 12 following attachment of the preformed, reinforced rubber connector hoses.

Referring now to the modified fourth embodiment thrust pack 1200 of FIGS. 12 and 13, the platforms 716-A and 716-B have been replaced with much abbreviated boot mounts 1201-A and 1201B. Threaded apertures 1202 enable a boot to be mounted to each boot mount 1201-A or 1201-B. The platforms 716-A and 716-B and the boot mounts 1201-A and 1201-B are collectively referred to, generically, as foot mounts.

Figure 14:
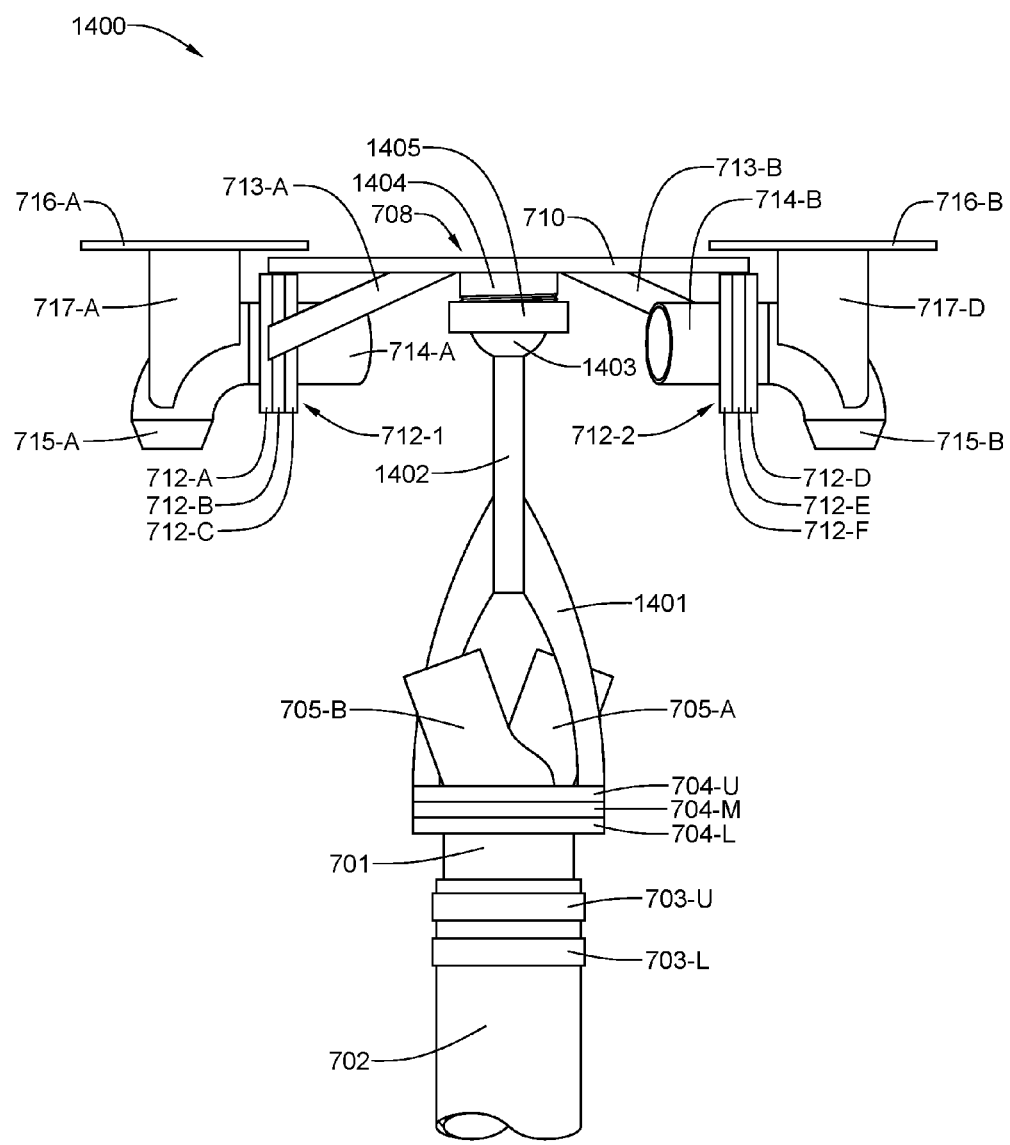
FIG. 14 is a front elevational view of a prototype fifth embodiment thrust pack before attachment of the preformed, reinforced rubber connector hoses.
Figure 15:
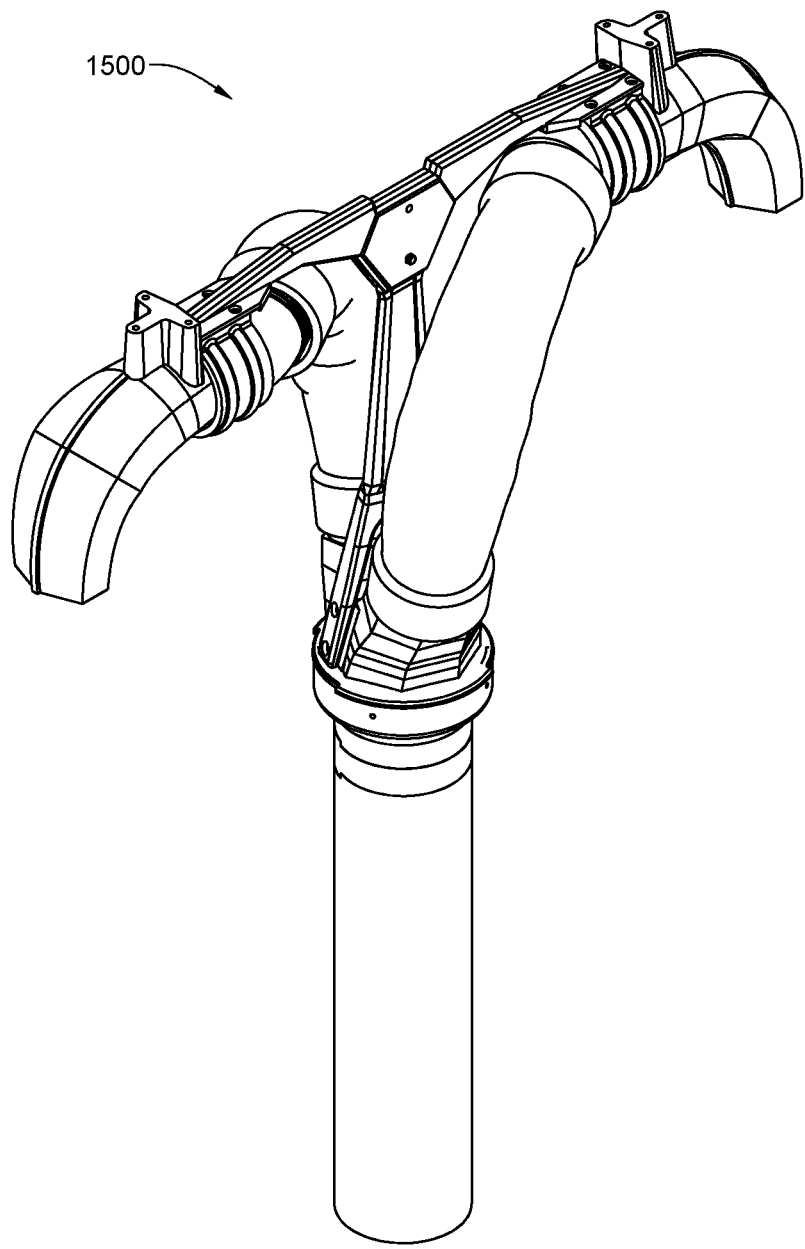
FIG. 15 is an isometric view from above of a pre-production version of the fourth embodiment thrust pack before installation of the rider mounts and buoyancy floats.
Figure 16:
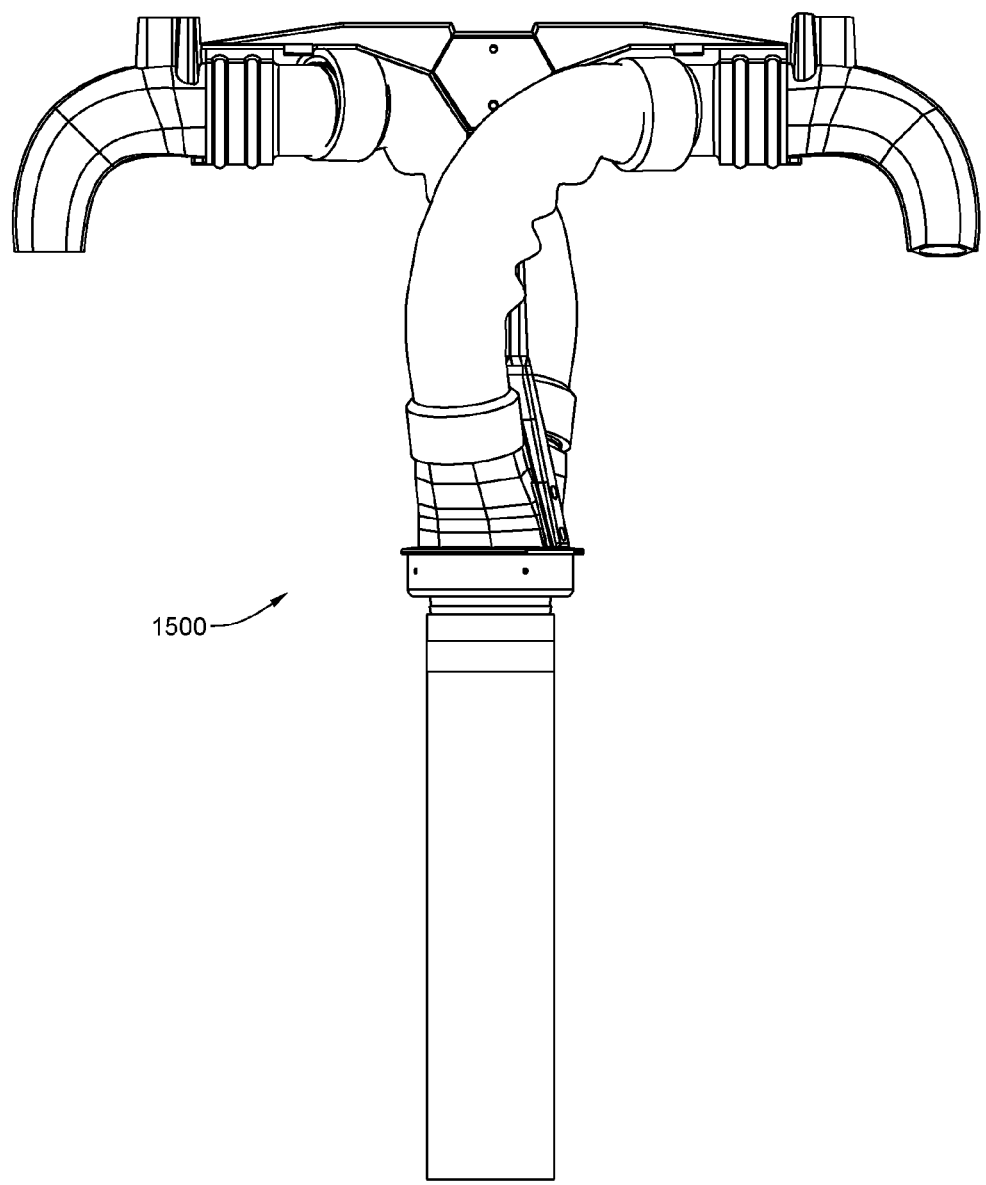
FIG. 16 is an elevational view of the pre-production version of the fourth embodiment thrust pack of FIG. 15.
Figure 17:
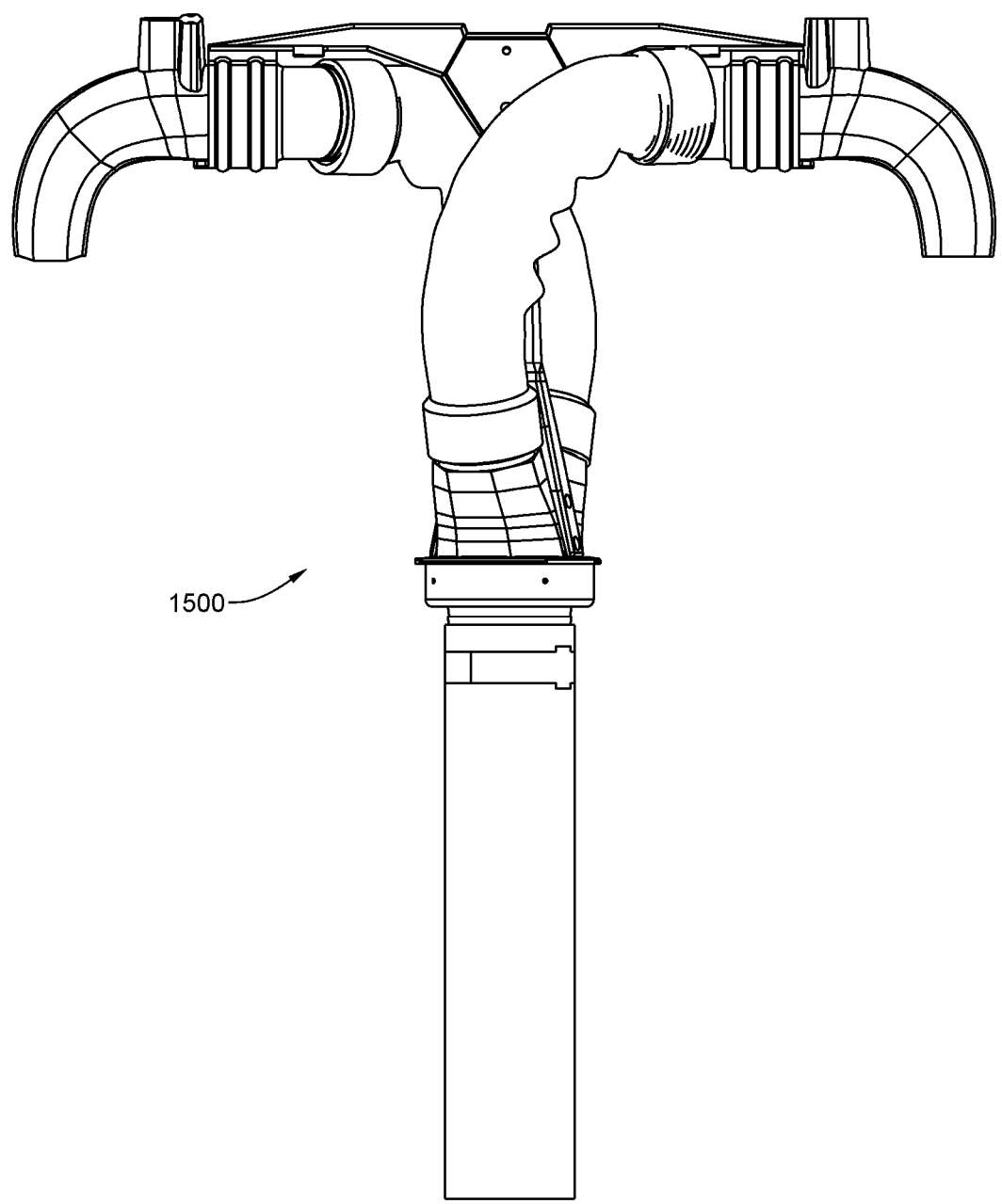
FIG. 17 is an alternative elevational view of the pre-production version of the fourth embodiment thrust pack of FIG. 15.
Figure 18:
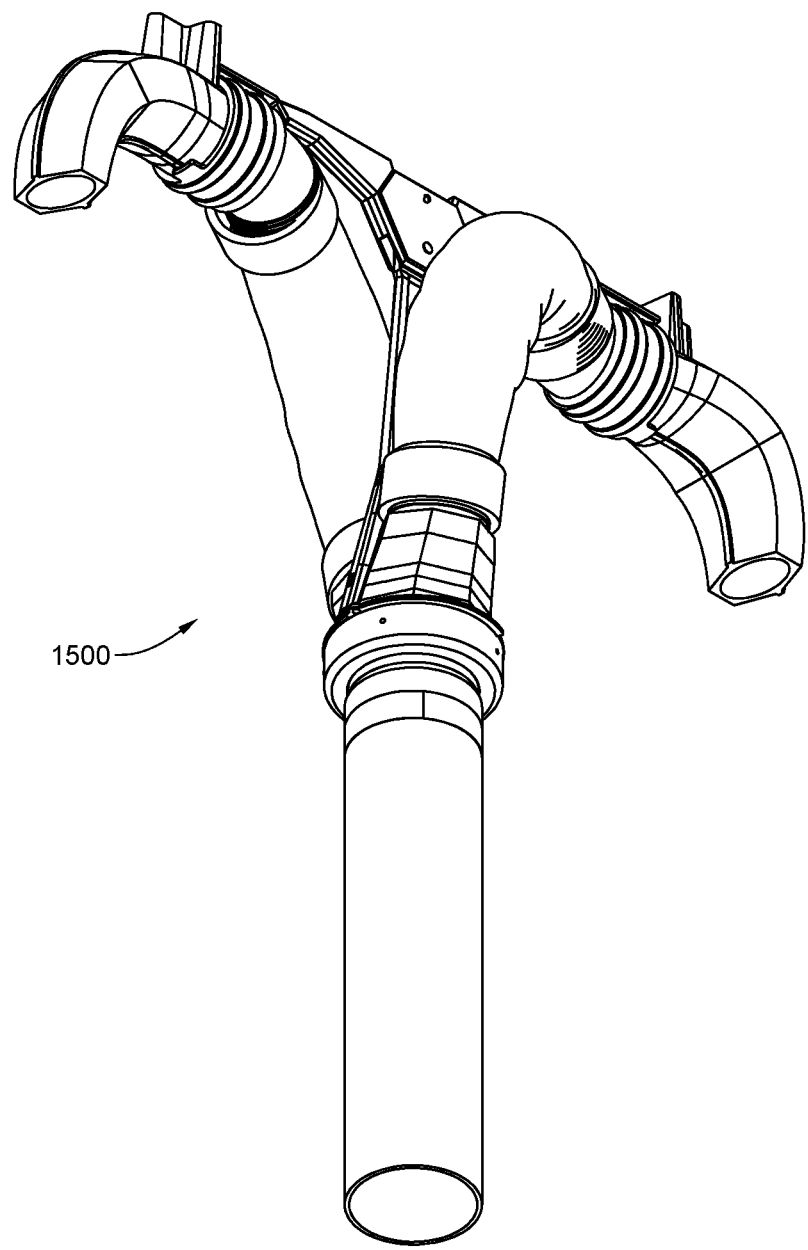
FIG. 18 is an isometric view from below of the pre-production version of the fourth embodiment thrust pack of FIG. 15.
Figure 19:
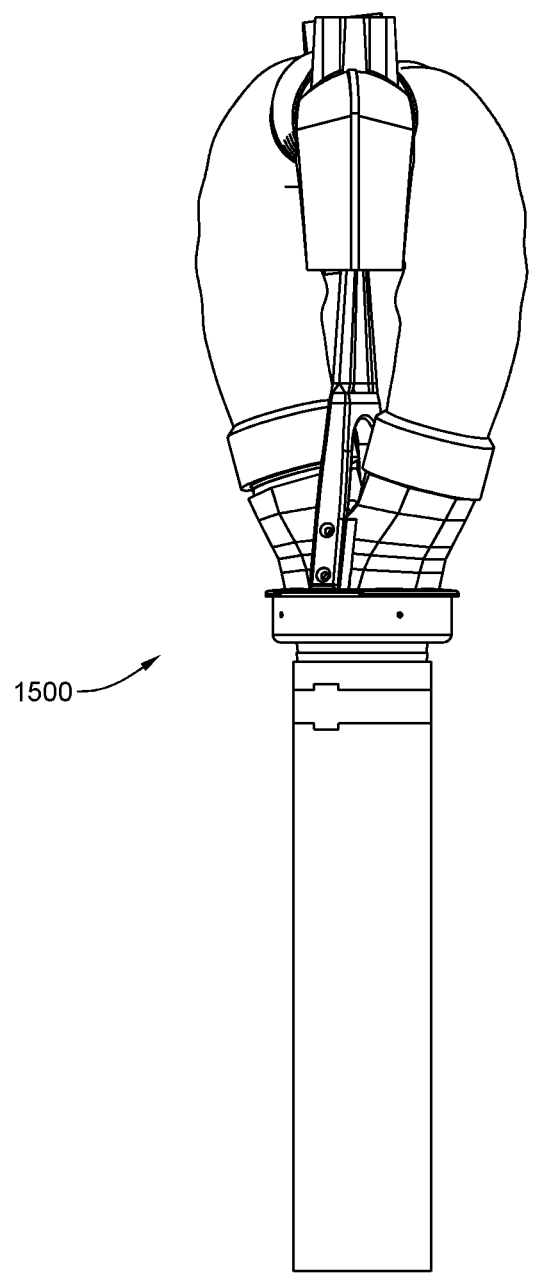
FIG. 19 is side elevational view of the pre-production version of the fourth embodiment thrust pack of FIG. 15.
Figure 20:
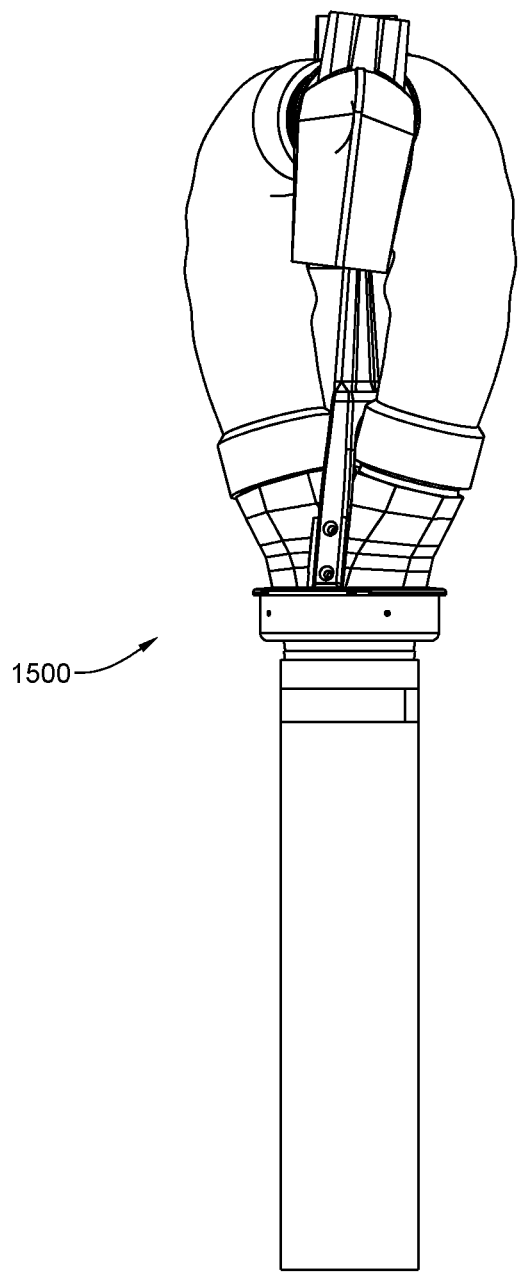
FIG. 20 is an alternative side elevational view of the pre-production version of the fourth embodiment thrust pack of FIG. 15.
Figure 21:
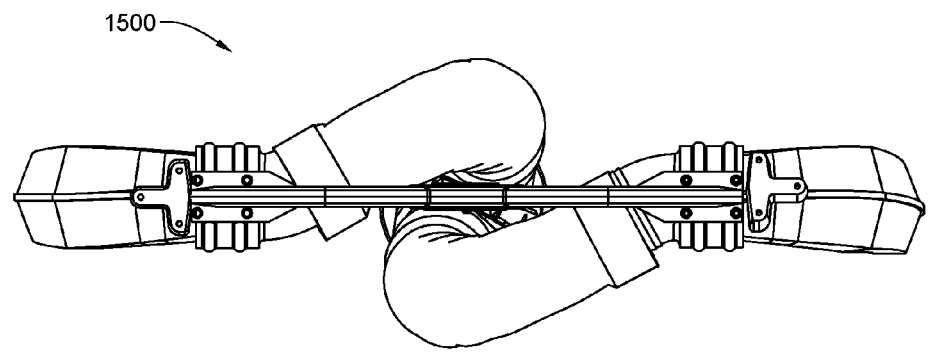
FIG. 21 is a top plan view of the pre-production version of the fourth embodiment thrust pack of FIG. 15.
Figure 22:
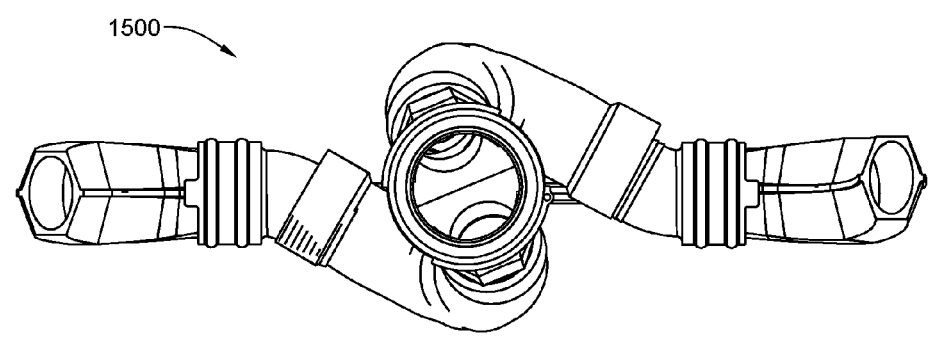
FIG. 22 is a bottom plan view of the pre-production version of the fourth embodiment thrust pack of FIG. 15.
Figure 23:
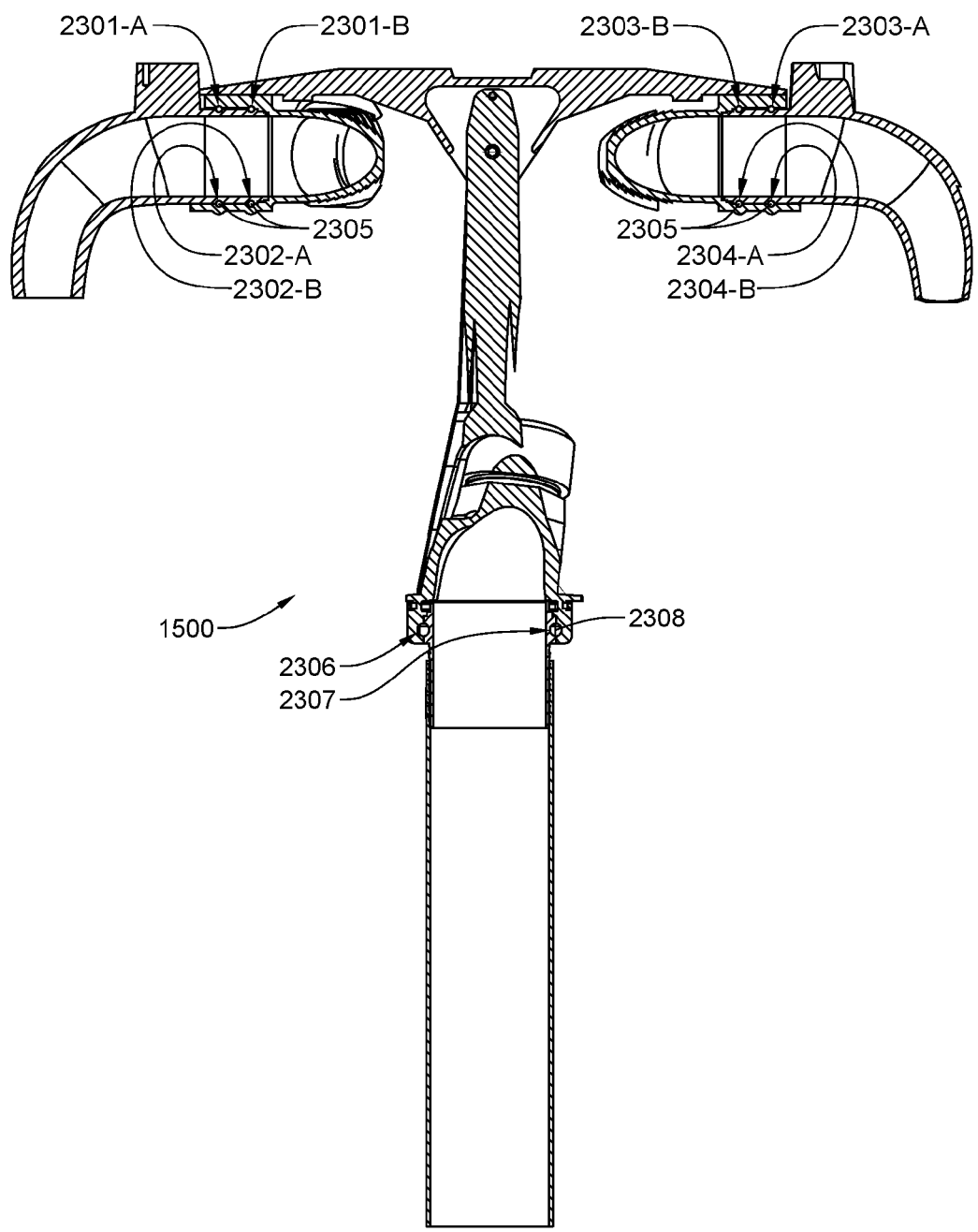
FIG. 23 is a cross sectional view of the pre-production version of the fourth embodiment thrust pack of FIG. 15, taken on a plane that passes through the first and third rotational axes.
Figure 24:
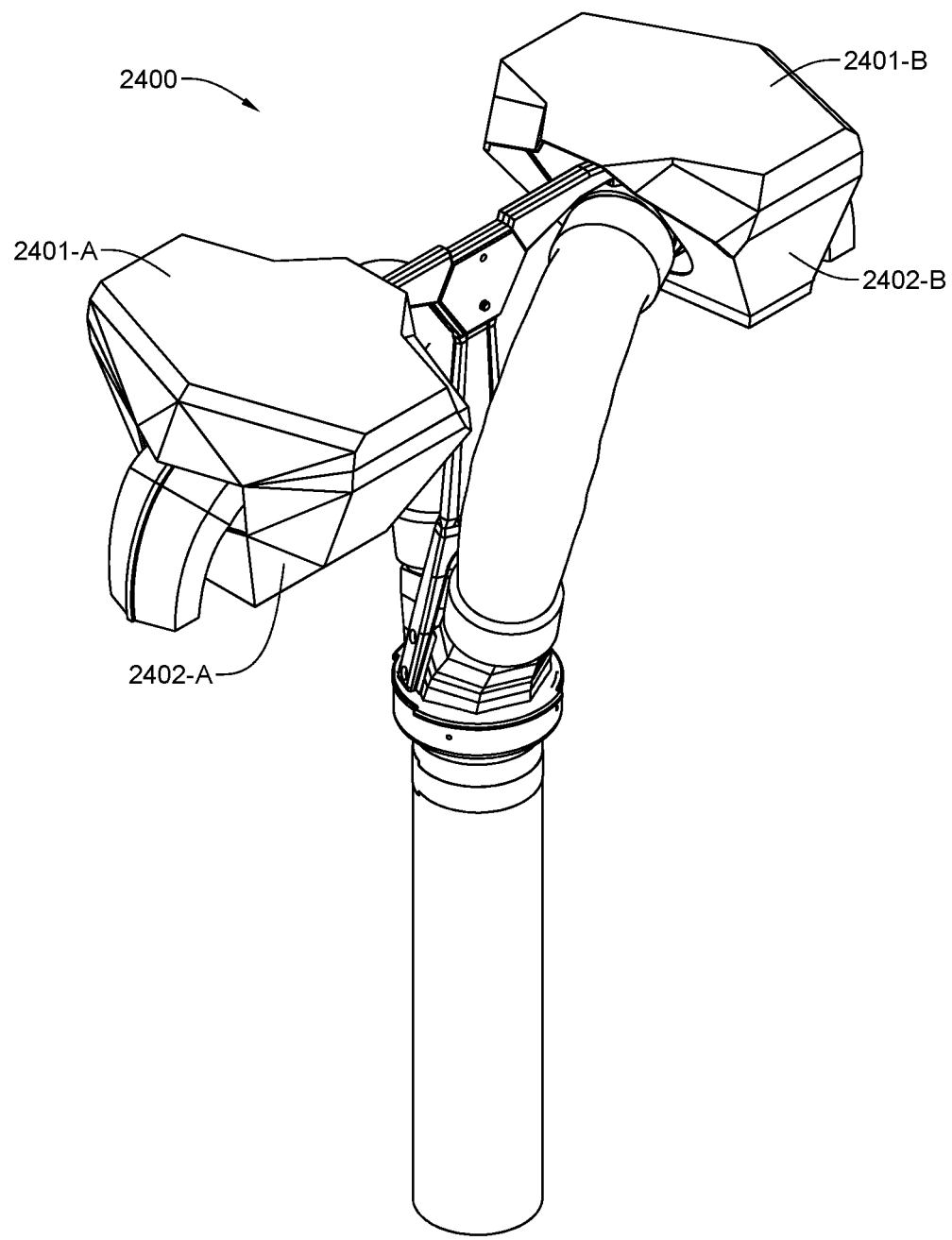
FIG. 24 is an isometric view from above of a pre-production version of the fourth embodiment thrust pack with the rider mounts and buoyancy floats installed.
Figure 25:
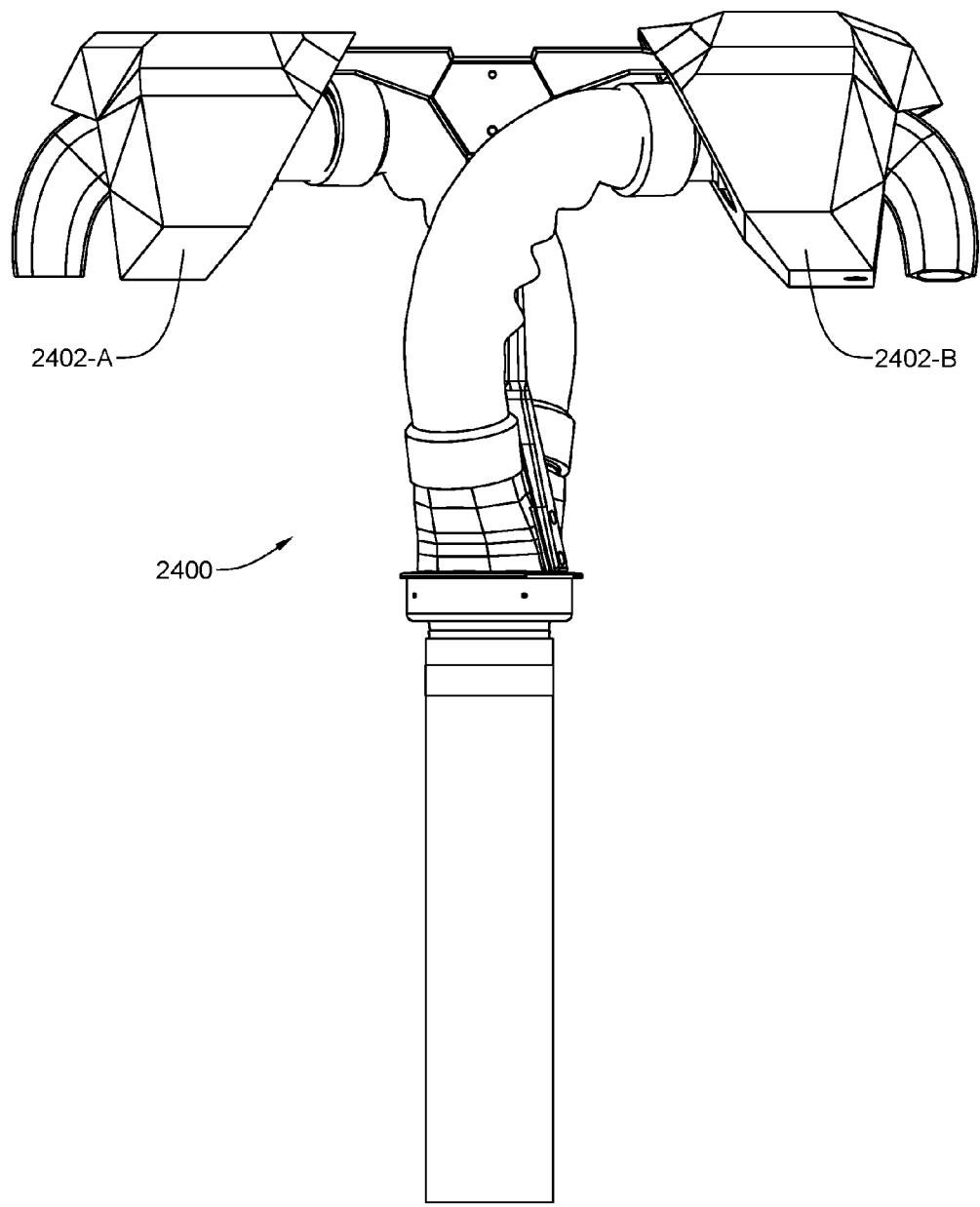
FIG. 25 is an elevational view of the pre-production version of the fourth embodiment thrust pack of FIG. 24.
Figure 26:
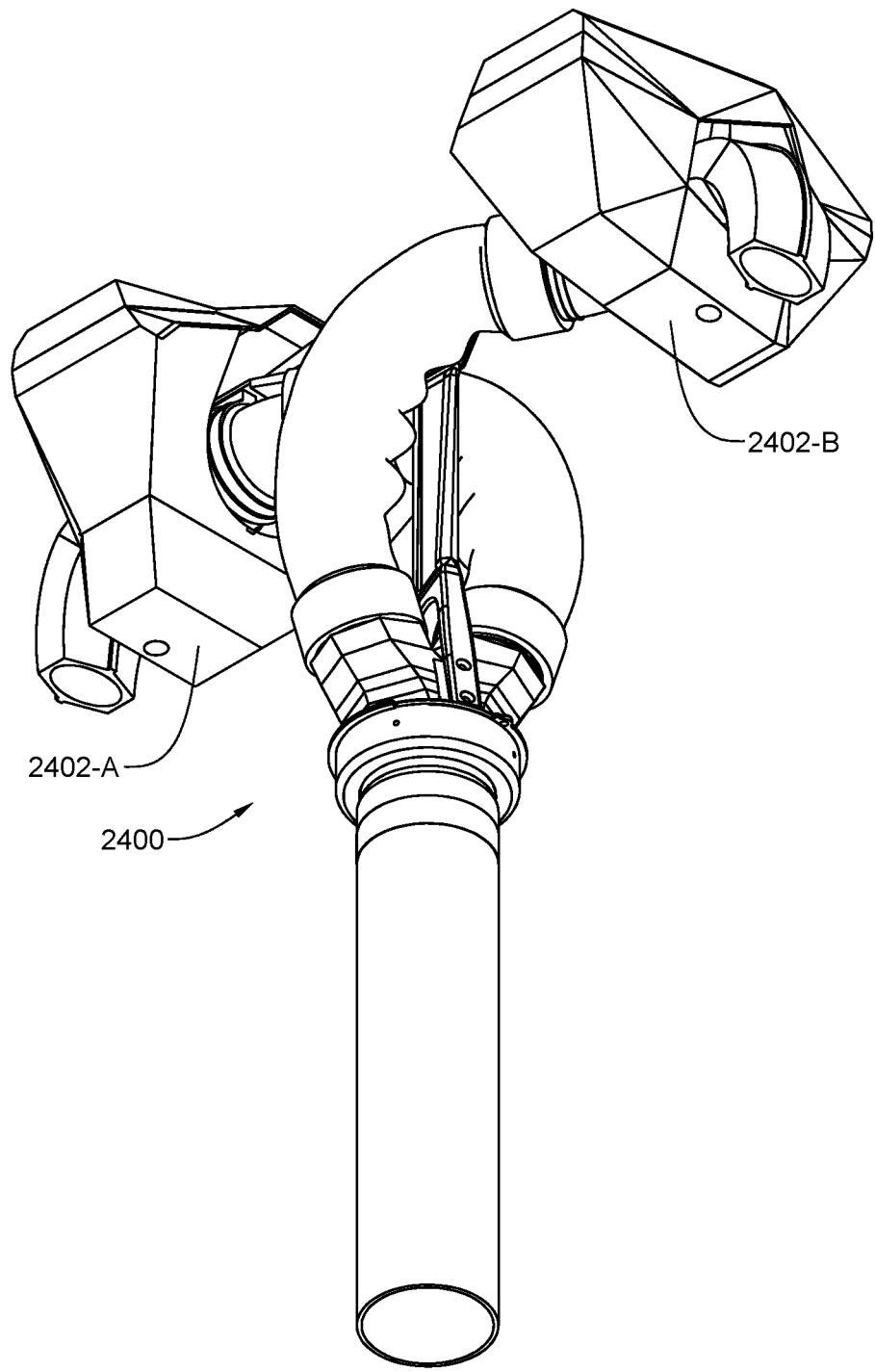
FIG. 26 is an isometric view from below of the pre-production version of the fourth embodiment thrust pack of FIG. 24.
Figure 27:
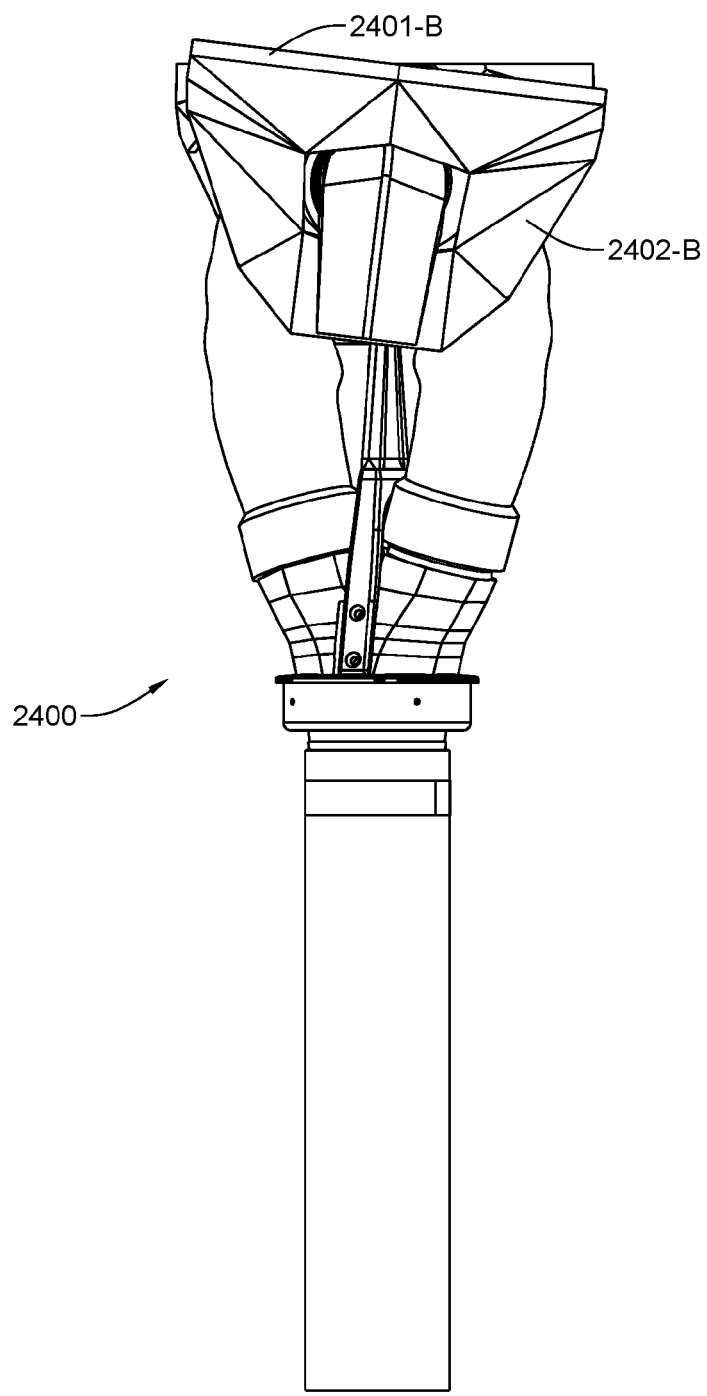
FIG. 27 is side elevational view of the pre-production version of the fourth embodiment thrust pack of FIG. 24.
Figure 28:
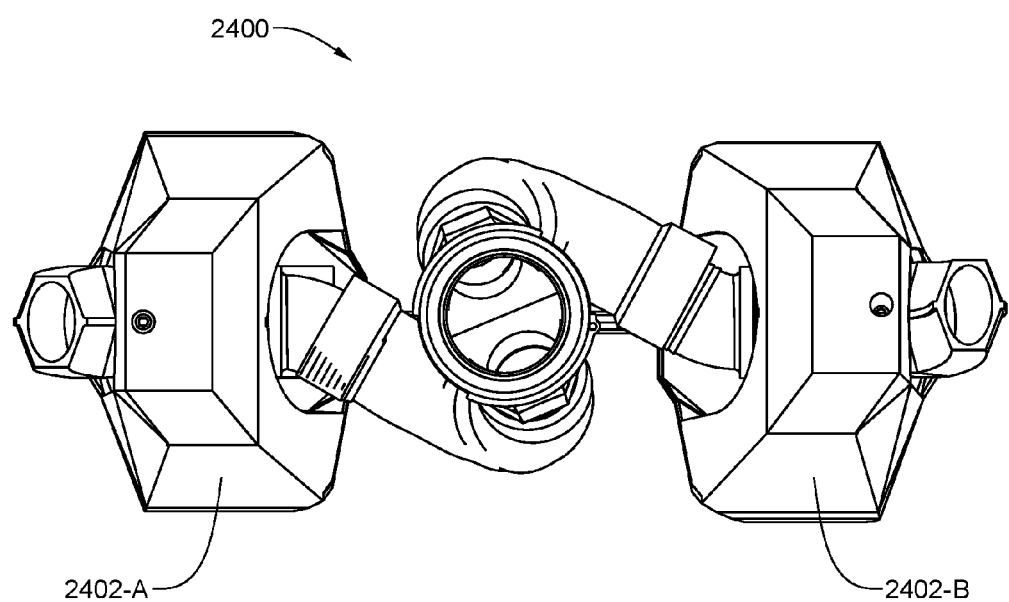
FIG. 28 is a bottom plan view of the pre-production version of the fourth embodiment thrust pack of FIG. 24.

Referring now to FIG. 14, a fifth embodiment thrust pack 1400 is similar to the fourth embodiment thrust pack 700 of FIGS. 7 to 11. The primary difference is that the single axis pivot 707 is replaced with a ball and socket joint. The tower support bracket 706 of the fourth embodiment thrust pack 700 has been replaced with a new tower support bracket 1401 that it can be welded to a cylindrical rod 1402. A solid ball 1403 is secured to a distal end of the cylindrical rod 1402. A threaded socket 1404 is rigidly secured to the horizontal cross beam 710, and a threaded cap 1405 secures the ball 1403 within the socket 1404. This arrangement differs from the fourth embodiment thrust pack 700 in that pivoting of the horizontal cross beam is not confined to a single axis of rotation.

Referring now to FIGS. 15 through 23, a pre-production version 1500 of the fourth embodiment thrust pack is shown without the rider mounts and buoyancy floats installed. Functionally, the pre-production version 1500 is identical to that of the prototype version of FIGS. 7 through 13. The primary physical difference between the prototype and the pre-production versions is that the rotational couplings of the prototype version, which were fabricated from lazy Susan bearing assemblies, have been replaced with purpose-built bearing assemblies in which aluminum races ride on ball bearings made of the tough polyoxymethylene (POM) engineering thermoplastic. Details of the purpose-built bearing assemblies can be seen in the cross-sectional drawing of FIG. 23. For the third rotational axis, aluminum bearing races 2301-A, 2301-B, 2302-A, 2302-B, 2303-A, 2303-B, 2304-A and 2304-B ride on POM ball bearings 2305. For the first rotational axis, aluminum bearing races 2306 and 2307 ride on POM ball bearings 2308.

Referring now to FIGS. 24 through 28, the pre-production version 1500 of the fourth embodiment thrust pack has been equipped with rider mounts 2401A and 2401B, which incorporate buoyancy float units 2402A and 2402B, respectively, resulting in a fully assembled fourth embodiment thrust pack 2400.

With the present invention, three axes of rotation are provided for the fluid-jet thrust pack. The first axis of rotation is at the first rotatable coupling where the flexible hose 702 is attached to the fluid-jet thrust unit 700. The second axis of rotation is at the pivot between the tower support bracket 706 and the cross arm assembly 708. The third axis of rotation is provided by the pair of coaxial rotatable couplings 712-1 and 712-2. It will be noted that each downward projecting jet nozzle 715-A and 715-B, as well as their associated boot mounting platforms 716-A and 716-B, respectively, can rotate independently of one another. It will also be noted that when the cross arm assembly 708 is level (i.e., untilted), all three axes of rotation are mutually perpendicular.

While only several embodiments of the invention has been illustrated and described, it will be obvious to those having ordinary skill in the art that modifications and changes may be made thereto without departing from the scope of the invention. For example, for the fourth embodiment thrust unit 700, dual coaxial pivots may be used to secure the cross arm assembly to a pair of tower support brackets, which straddle both stub supply pipes. With such a design, there is no hardware separating the two hoses where the cross arm assembly tilts. Although such a design requires a much wider cross arm assembly, such a design is entirely usable, and the somewhat straighter water flow path may result in less restriction of flow as water travels from the stub supply pipes to the stub receiver pipes.

What is claimed is:

1. A personal jet propulsion system powered by a flow of pressurized fluid emanating from an output of a hydraulic pump, the system comprising:
   a hose having a first end coupled to the hydraulic pump output;
   a fluid-jet thrust pack having
      a input coupled to a second end of the hose;
      a pair of rider mounts, each of which is securable to one foot of a rider, each of which is equipped with at least one nozzle through which a jet of fluid from the hydraulic pump can escape in a direction opposite a bottom of a rider's foot mounted thereon;
      a first rotatable coupling that provides a first rotational axis for movement of the rider, said first rotational axis being coaxial with said input;
      a pivot providing a second rotational axis that is perpendicular to the first rotational axis, and about which both rider support platforms are simultaneously rotatable; and
      second and third rotatable couplings that provide a third rotational axis, and about which each of said rider mounts is independently rotatable.

2. The personal jet propulsion system of claim 1, wherein said pivot is provided by at least one additional rotatable coupling through which fluid from the input passes in route to the second and third rotatable couplings.

3. The personal jet propulsion system of claim 2, wherein said first rotatable coupling and said at least one additional rotatable coupling are joined by a length of rigid conduit through which fluid from the input passes in route to the second and third rotatable couplings.

4. The personal jet propulsion system of claim 2, wherein fluid flow, after passing through said one additional rotatable coupling, is split into equal flows en route to said second and third rotatable couplings.

5. The personal jet propulsion system of claim 4, wherein each equal flow passes through at least 180 degrees of deflection enroute to said second and third rotatable couplings.

6. The personal jet propulsion system of claim 2, wherein said pivot is provided by fourth and fifth rotatable couplings through which fluid flow, equally split from the input, passes in route to the second and third rotatable coupling s, respectively.

7. The personal jet propulsion system of claim 6, wherein said fourth and fifth couplings are joined to said first coupling via two sections of shaped conduit, each of which carries half of the fluid flow.

8. The personal jet propulsion system of claim 7, wherein between said second and fourth and between said third and fifth rotatable couplings, fluid flows through a 90-degree elbow.

9. The personal jet propulsion system of claim 1, wherein:
   said pivot is positioned at a distal end of a tower support bracket, a base of which is rigidly secured to the first rotatable coupling;
   a cross arm assembly is secured at its midpoint to said pivot in teeter-totter fashion, and said second and third rotatable couplings are rigidly secured to opposite ends of said cross arm assembly;
   said first rotatable coupling is equipped with a fluid flow splitter having first and second exit ports; and
   a first flexible hose interconnects the first port to the second rotatable coupling; and
   a second flexible hose interconnects the second port to the third rotatable coupling.

10. The personal jet propulsion system of claim 9, wherein said pivot is a ball and socket joint.

11. The personal jet propulsion system of claim 9, wherein said pivot provides rotation about a single axis.

12. The personal jet propulsion system of claim 1, wherein said first rotational axis corresponds to a roll axis, said second rotational axis corresponds to a yaw axis, and said third rotational axis corresponds to a pitch axis.

13. A personal jet propulsion system powered by a flow of pressurized fluid emanating from an output of a hydraulic pump, the system comprising:
   a hose having a first end coupled to the hydraulic pump output;
   a fluid-jet thrust pack having
      a input coupled to a second end of the hose;
      a pair of rider mounts, each of which is securable to one foot of a rider, and each of said mounts being equipped with at least one nozzle through which a jet of fluid from the hydraulic pump can escape in a direction opposite a bottom of a rider's mounted foot;
      a first rotatable coupling that provides a first rotational axis for movement of the rider, said first rotational axis being coaxial with said input;
      a pivot positioned at a distal end of a tower support bracket, a base of which is rigidly secured to the first rotatable coupling;
      a cross arm assembly secured at its midpoint to said pivot in teeter-totter fashion, said rider mounts being secured to opposite ends of said cross arm assembly, said pivot and cross arm assembly providing rotation about at least one axis that is perpendicular to the first rotational axis, and about which both rider mounts are simultaneously rotatable; and second and third rotatable couplings that provide a third rotational axis, about which each of said pair of platforms is independently rotatable.

14. The personal jet propulsion system of claim 13, wherein said first rotatable coupling is equipped with a fluid flow splitter having first and second exit ports; and
   a first flexible hose interconnects the first port to the second rotatable coupling; and
   a second flexible hose interconnects the second port to the third rotatable coupling.

15. The personal jet propulsion system of claim 13, wherein said pivot is selected from the group consisting of a ball and socket joint and a single-axis pivot.

16. The personal jet propulsion system of claim 13, wherein said first rotational axis corresponds to a roll axis, said second rotational axis corresponds to a yaw axis, and said third rotational axis corresponds to a pitch axis.

17. A method of operating a personal propulsion device comprising the steps of:
   providing a personal fluid-jet propulsion unit having two rider mounts, each of which is securable to one foot of a rider;
   providing a hose which is coupled to an output of a fluid pump;
   providing a coupler for coupling the hose to the personal fluid-jet propulsion unit;
   providing a first rotatable coupling that is coaxial with the coupler, and which has a first rotational roll axis;
   incorporating within the personal fluid-jet propulsion unit a second rotational axis that is perpendicular to the first rotational yaw axis, and about which both platforms are simultaneously rotatable;
   incorporating within the personal fluid-jet propulsion unit a third rotational pitch axis about said rider mounts are independently rotatable; and
   providing at least one propulsion nozzle beneath each rider mount that expels about half of the output of the fluid pump in a direction that is opposite a bottom of a rider's foot mounted thereon.

18. The method according to claim 17, wherein each of said pair of platforms is independently rotatable about said third rotational pitch axis.

19. The method according to claim 17, wherein the delivery of water from the fluid pump to the propulsion nozzles is sufficient to lift a rider weighing about 40 kilograms to a height of at least 1 meter for a sustained period of time.

20. The method according to claim 17, wherein delivery of water from the fluid pump to the personal fluid-jet propulsion unit is within a range of about 1892.5 to 5678 liters (about 500 to 1500 gallons) per minute.

* * * * *